United States Patent
Klasen-Memmer et al.

(10) Patent No.: US 6,969,542 B2
(45) Date of Patent: *Nov. 29, 2005

(54) LIQUID-CRYSTAL MEDIUM, AND ELECTRO-OPTICAL DISPLAY CONTAINING SAME

(75) Inventors: Melanie Klasen-Memmer, Heuchelheim (DE); Clarissa Weller, Moerfelden/Walldorf (DE); Matthias Bremer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 252 days.

This patent is subject to a terminal disclaimer.

(21) Appl. No.: 10/022,523

(22) Filed: Dec. 20, 2001

(65) Prior Publication Data

US 2003/0017279 A1 Jan. 23, 2003

(30) Foreign Application Priority Data

Dec. 20, 2000 (DE) .......................... 100 63 943

(51) Int. Cl.⁷ ........................ C09K 19/34; C09K 19/30; C09K 19/12
(52) U.S. Cl. .............. 428/1.1; 252/299.61; 252/299.63; 252/299.66
(58) Field of Search ...................... 428/1.1; 252/299.61, 252/299.63, 299.66, 299.01

(56) References Cited

U.S. PATENT DOCUMENTS

| | | | | |
|---|---|---|---|---|
| 5,883,686 A | * | 3/1999 | Leenhouts et al. | 349/177 |
| 6,027,665 A | * | 2/2000 | Pausch et al. | 252/299.61 |
| 6,190,576 B1 | * | 2/2001 | Andou et al. | 252/299.63 |
| 6,319,570 B1 | * | 11/2001 | Andou et al. | 428/1.1 |
| 6,395,353 B2 | * | 5/2002 | Yanai et al. | 428/1.1 |
| 6,548,126 B1 | * | 4/2003 | Sasada et al. | 428/1.1 |
| 6,592,951 B2 | * | 7/2003 | Heckmeier et al. | 428/1.1 |
| 6,635,318 B2 | * | 10/2003 | Kirsch et al. | 428/1.1 |
| 6,764,722 B2 | * | 7/2004 | Klasen et al. | 428/1.1 |

FOREIGN PATENT DOCUMENTS

WO    WO 97/36847    * 10/1997

* cited by examiner

*Primary Examiner*—Shean C. Wu
(74) *Attorney, Agent, or Firm*—Millen, White, Zelano, Branigan, P. C.

(57) ABSTRACT

The present invention relates to nematic liquid-crystal media which comprise a) a dielectrically negative, liquid-crystalline component A comprising one or more compounds of the formula I

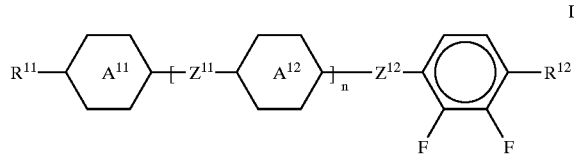

in which the parameters are as defined in the text, and b) a dielectrically negative, liquid-crystalline component B, and optionally c) a dielectrically neutral, liquid-crystalline component C, and optionally d) a dielectrically positive, liquid-crystalline component D, and to the use of these media in liquid-crystal displays, and to liquid-crystal displays which use these media, in particular VAN and IPS displays.

21 Claims, No Drawings

LIQUID-CRYSTAL MEDIUM, AND ELECTRO-OPTICAL DISPLAY CONTAINING SAME

The present invention relates to liquid-crystal displays, particularly active matrix addressed liquid-crystal displays (AMDs or AMLCDs), especially those which use an active matrix comprising thin film transistors (TFTs) or varistors. In addition, the present application relates to liquid-crystal media for use in displays of this type. AMDs of this type are able to use various active electronic switching elements. The most widespread are displays which use three-pole switching elements. These are also preferred in the present invention. Examples of three-pole switching elements of this type are MOS (metal oxide silicon) transistors or the above-mentioned TFTs or varistors. In the TFTs, various semiconductor materials, predominantly silicon or alternatively cadmium selenide, are used. In particular, poly-crystalline silicon or amorphous silicon is- used. In contrast to the three-pole electronic switching elements, matrixes of 2-pole switching elements, such as, for example, MIM (metal insulator metal) diodes, ring diodes or "back to back" diodes, can also be employed in AMDs. However, as also explained in greater detail below, these are generally not preferred owing to the worse electrooptical properties achieved by the AMDs.

The liquid crystals used as dielectrics in liquid-crystal displays of this type are those whose optical properties change reversibly on application of an electric voltage. Electro-optical displays which use liquid-crystals as media are known to the person skilled in the art. These liquid-crystal displays use various electro-optical effects.

The most widespread conventional displays use the TN effect (twisted nematic, having a nematic structure which is twisted by about 90°), the STN effect (supertwisted nematic) or the SBE effect (supertwisted birefringence effect). In these and similar electro-optical effects, liquid-crystalline media of positive dielectric anisotropy ($\Delta \epsilon$) are used.

Since the operating voltage in displays in general, i.e. including in displays using these effects, should be as low as possible, use is made of liquid-crystal media of large dielectric anisotropy, which are generally composed predominantly of dielectrically positive liquid-crystal compounds and at most comprise relatively small/low proportions of dielectrically neutral compounds.

In contrast to the conventional displays utilizing electro-optical effects which require liquid-crystal media of positive dielectric anisotropy, there are other electro-optical effects which use liquid-crystal media of negative dielectric anisotropy, such as, for example, the ECB effect (electrically controlled birefringence) and its sub-forms DAP (deformation of aligned phases), VAN (vertically aligned nematics) and CSH (colour super homeotropics). These are the subject-matter of the present application.

The IPS (in plane switching) effect, which has been employed to an increased extent recently, can use both dielectrically positive and dielectrically negative liquid-crystal media, similarly to "guest/host" displays, which can employ dyes either in dielectrically positive or in dielectrical negative media, depending on the display mode used. In the case of the liquid-crystal displays mentioned in this paragraph, those which use dielectrically negative liquid-crystal media are also the subject-matter of the present application.

A further highly promising type of liquid-crystal display are so-called "axially symmetric microdomain" (abbreviated to ASM) displays, which are preferably addressed by means of plasma arrays (plasma addressed liquid crystal displays, or PA LCDs). These displays are also the subject-matter of the present application.

The liquid-crystal media employed in the above-mentioned liquid-crystal displays and all liquid-crystal displays which utilize similar effects generally consist predominantly and in most cases even very substantially of liquid-crystal compounds having the corresponding dielectric anisotropy, i.e. of compounds of positive dielectric anisotropy in the case of dielectrically positive media and of compounds of negative dielectric anisotropy in the case of dielectrically negative media.

In the media used in accordance with the present application, at most significant amounts of dielectrically neutral liquid-crystal compounds and in general only very small amounts or even no dielectrically positive compounds at all, are typically employed, since in general the liquid-crystal displays should have the lowest possible addressing voltages. For this reason, liquid-crystal compounds having the opposite sign of the dielectric anisotropy to the dielectric anisotropy of the medium are generally employed extremely sparingly or not at all.

The liquid-crystal media of the prior art have relatively low low-temperature stabilities. Thus, the nematic phases often extend only down to −20° C. and in some cases even only down to −10° C. In addition, the threshold voltages ($V_0$) are at the same time relatively high, in most cases even greater than 2 V.

For the most part, the liquid-crystal media of the prior art have relatively unfavourable values for $\Delta n$, which are often greater than 0.10. However, such large $\Delta n$ values are not particularly advantageous for VAN displays, since small values for the optical retardation are typically used in VAN displays. Thus, for example, a d·$\Delta n$ of approximately 0.30 $\mu$m is employed in the case of an untwisted director orientation or a d·$\Delta n$ of approximately 0.40 $\mu$m is employed with a 90° twist. Such large $\Delta n$ values require the realization of very small layer thicknesses, which, although favorable for the response times observed, result, however, in low production yields.

In most cases, the most favorable $\Delta n$ values for practical displays are in the range from 0.07 to 0.12. This also applies to IPS displays.

In addition, the response time of the prior-art displays is often inadequately long, in particular for video-capable displays. Thus, the viscosities of the liquid-crystal media must be improved, i.e. reduced. This applies in particular to the rotational viscosity and very particularly at low temperatures. A reduction in the flow viscosity generally results, in particular in the case of displays having a homeotropic edge alignment of the liquid crystals (for example in ECB and VAN displays), in a shortening of the filling times during production of the displays.

Thus, there has been and continues to be a great demand for liquid-crystal media which do not have the disadvantages of the media from the prior art or at least do so to a significantly reduced extent.

Surprisingly, it has been found that this is achieved by the liquid-crystal media according to the invention. These media comprise a) a dielectrically negative, liquid-crystalline component (component A) which comprises one or more dielectrically negative compound(s) of the formula I

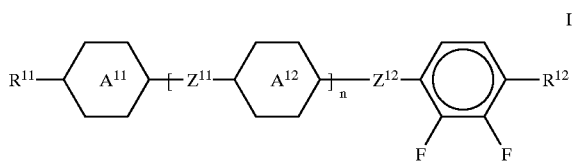

in which

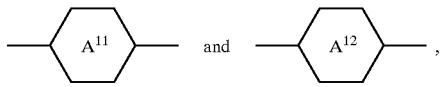

independently of one another, are

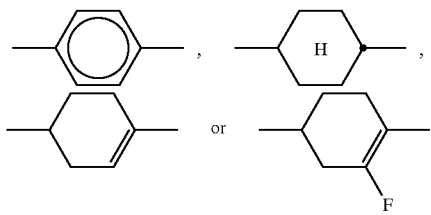

preferably, independently of one another, are

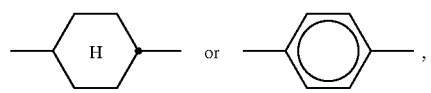

particularly preferably

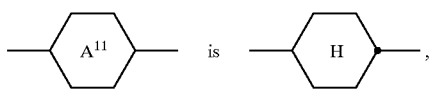

is $R^{11}$ is alkyl having from 1 to 7 carbon atoms, preferably n-alkyl, particularly preferably n-alkyl having from 1 to 5 carbon atoms, alkoxy having from 1 to 7 carbon atoms, preferably n-alkoxy, particularly preferably n-alkoxy having from 1 to 5 carbon atoms, or alkoxyalkyl, alkenyl or alkenyloxy having from 2 to 7 carbon atoms, preferably having from 2 to 4 carbon atoms, preferably alkenyloxy, $R^{12}$ is alkyl or alkoxy having from 1 to 7 carbon atoms, preferably alkoxy, preferably n-alkoxy and particularly preferably n-alkoxy having from 2 to 5 carbon atoms, or alkoxyalkyl, alkenyl or alkenyloxy having from 2 to 7 carbon atoms, preferably having from 2 to 4 carbon atoms, preferably alkenyloxy, one of $Z^{11}$ and $Z^{12}$ is $OCF_2$ or $CF_2O$ and the other is a single bond, and n is 0 or 1, and b) a dielectrically negative, liquid-crystalline component (component B), which preferably comprises one or more dielectrically negative compound(s) selected from the group consisting of the compounds of the formulae II and III

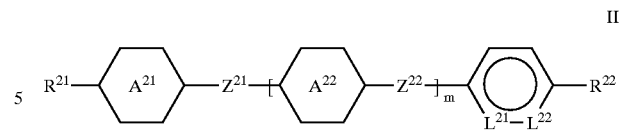

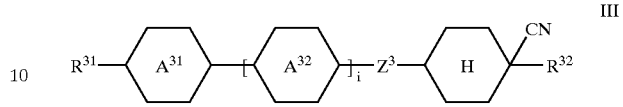

in which $R^{21}$ is alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkoxyalkyl, alkenyl or alkenyloxy having from 2 to 7 carbon atoms, preferably having from 2 to 4 carbon atoms, preferably alkenyloxy, $R^{22}$ is alkyl having from 1 to 7 carbon atoms, preferably n-alkyl, particularly preferably n-alkyl having from 1 to 3 carbon atoms, alkoxy having from 1 to 7 carbon atoms, preferably n-alkoxy, particularly preferably n-alkoxy having from 2 to 5 carbon atoms, or alkenyloxy having from 2 to 7 carbon atoms, preferably having from 2 to 4 carbon atoms, $Z^{21}$ and $Z^{22}$ are each, independently of one another, $-CH_2-CH_2-$, $-CH=CH-$, $-C\equiv C-$, $-COO-$ or a single bond, preferably $-CH_2-CH_2-$ or a single bond and particularly preferably a single bond,

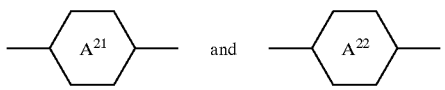

are each, independently of one another,

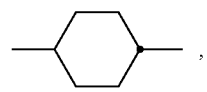

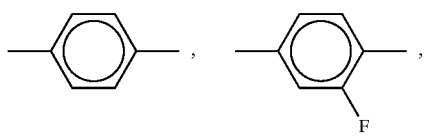

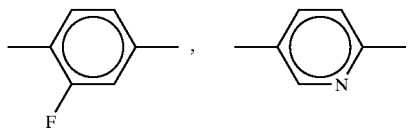

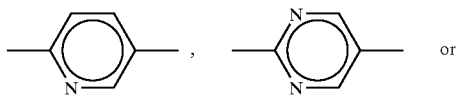

or

preferably

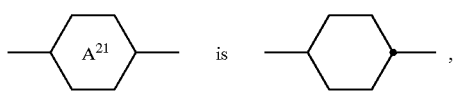

and, if present,

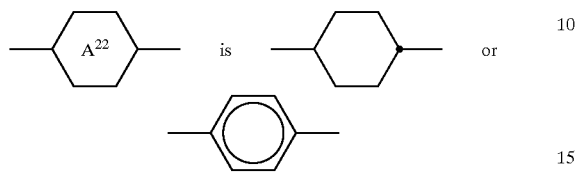

$L^{21}$ and $L^{22}$ are both C—F or one of the two is N and the other is C—F, preferably both are C—F, and
m is 0 or 1,

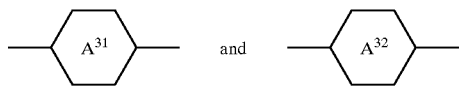

are each, independently of one another, as defined above for

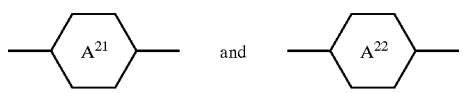

respectively in the case of the formula II,
$Z^3$ is —CH$_2$—CH$_2$—, —CH=CH—, —C≡C—, —COO— or a single bond, preferably —CH$_2$—CH$_2$— or a single bond and particularly preferably a single bond,
$R^{31}$ and $R^{32}$ are each, independently of one another, alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkenyloxy having 2 to 7 carbon atoms, preferably having from 2 to 4 carbon atoms, and
l is 1 or 2,
and optionally
c) a dielectrically neutral component (component C) which comprises one or more dielectrically neutral compound(s) of the formula IV

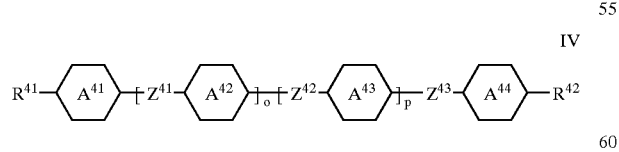

in which
$R^{41}$ and $R^{42}$ are each, independently of one another, as defined above for $R^{21}$ in the case of the formula II,
$Z^{41}$, $Z^{42}$ and $Z^{43}$ are each, independently of one another, —CH$_2$CH$_2$—, —CH=CH—, —COO— or a single bond,

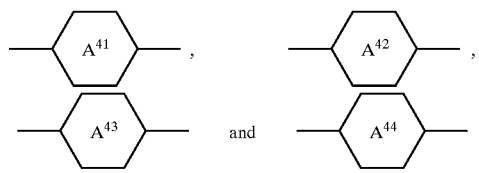

are each, independently of one another,

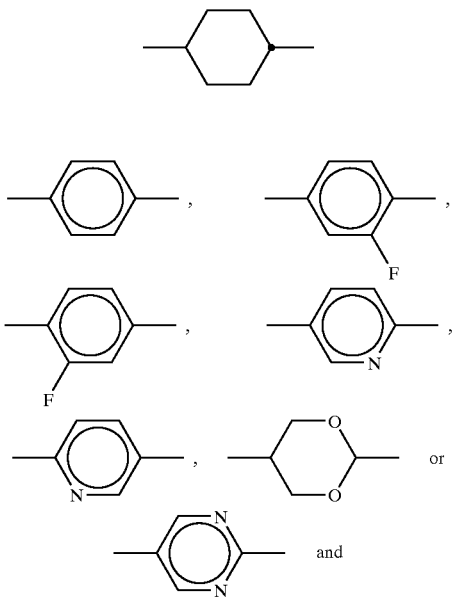

o and p, independently of one another, are 0 or 1,
the variables in formula IV are preferably
$R^{41}$ and $R^{42}$ are each, independently of one another, alkyl or alkoxy having 1–5 carbon atoms or alkenyl having 2–5 carbon atoms,

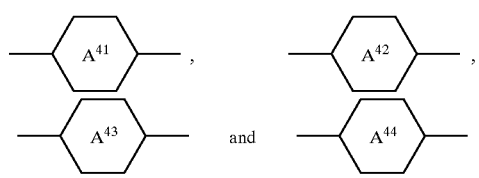

are each, independently of one another,

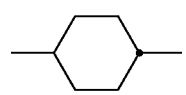

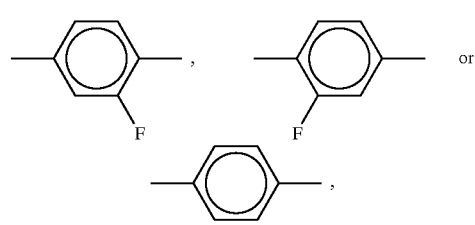

and very particularly preferably at least two of these rings

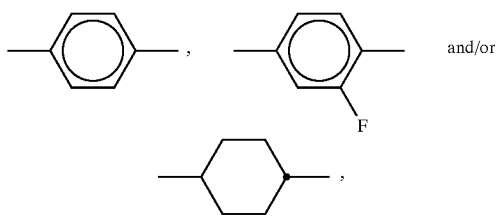

where two adjacent rings are very particularly preferably linked directly to one another, preferably

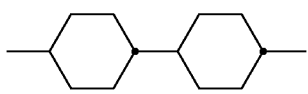

or

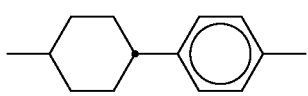

and optionally d) one or more dielectric positive compound(s) of the formula V

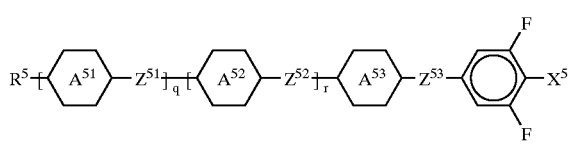

in which

R$^5$ is alkyl or alkoxy having from 1 to 7 carbon atoms, or alkoxyalkyl, alkenyl or alkenyloxy having from 2 to 7 carbon atoms, Z$^{51}$, Z$^{52}$ and Z$^{53}$ are each, independently of one another, —CH$_2$—CH$_2$—, —CH=CH—, —C≡C—, —COO— or a single bond,

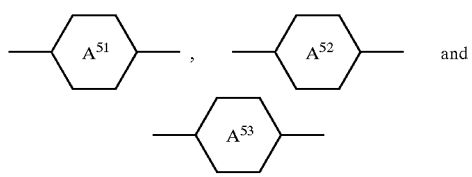

are each, independently of one another,

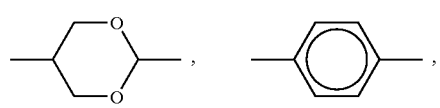

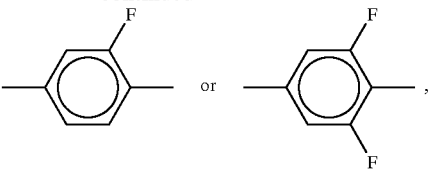

X$^5$ is F, OCF$_2$H or OCF$_3$, and
Y$^5$ is H or F, preferably F in the case where X=F or OCF$_2$H, and
q and r are each, independently of one another, 0 or 1.

In a further preferred embodiment, the medium comprises one or more dielectrically negative compounds of the formula VI

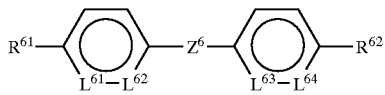

in which

R$^{61}$ and R$^{62}$ are alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkenyloxy having from 2 to 7 carbon atoms, preferably having from 2 to 4 carbon atoms, very particularly preferably both are n-alkoxy having from 1 to 5 carbon atoms, II, Z$^6$ is as defined above for Z$^{21}$ in the case of the formula L$^{61}$ and L$^{62}$ are both C—F or one of the two is N and the other is C—F, and L$^{63}$ and L$^{64}$ are both C—F or one of the two is N and the other is C—F.

In a further preferred embodiment, the medium comprises one or more dielectrically negative compounds of the formula VII

in which

R$^{71}$ and R$^{72}$ are alkyl having from 1 to 7 carbon atoms, preferably n-alkyl and particularly preferably n-alkyl having from 1 to 5 carbon atoms, alkoxy having from 1 to 7 carbon atoms, preferably n-alkoxy and particularly preferably n-alkoxy having from 2 to 5 carbon atoms, or alkenyloxy having from 2 to 7 carbon atoms, preferably having from 2 to 4 carbon atoms, very particularly preferably both are n-alkoxy having from 1 to 5 carbon atoms, and L$^{71}$ and L$^{72}$ are both C—F or one of the two is N and the other is C—F.

Component A preferably consists predominantly, particularly preferably consists essentially completely and very particularly preferably consists virtually completely, of one or more compounds of the formula I. These compounds of the formula I are preferably selected from the group consisting of the compounds of the formulae I-1 to I-8:

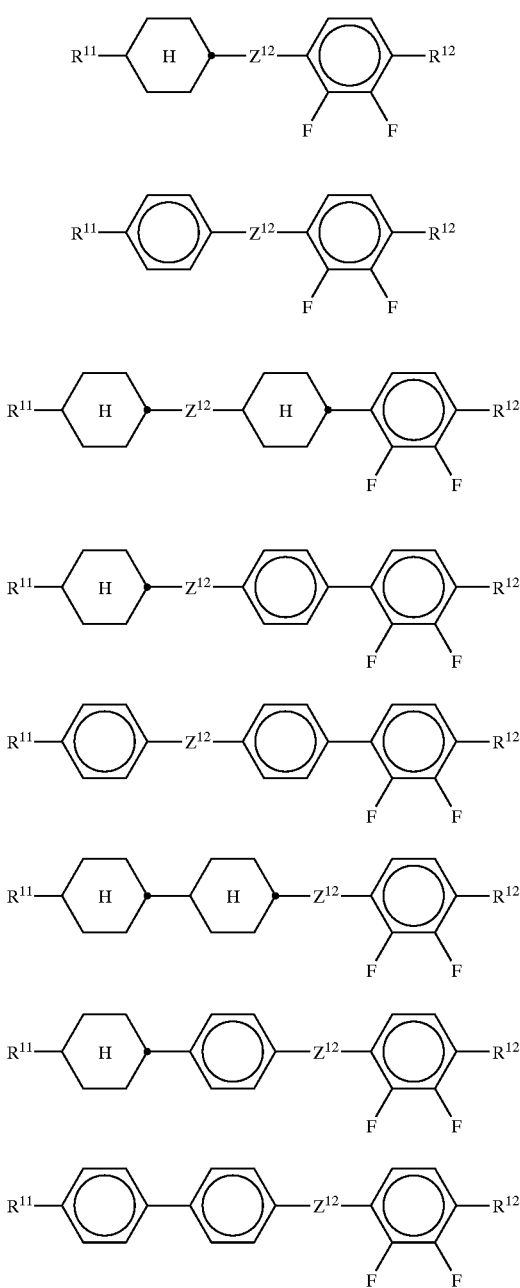
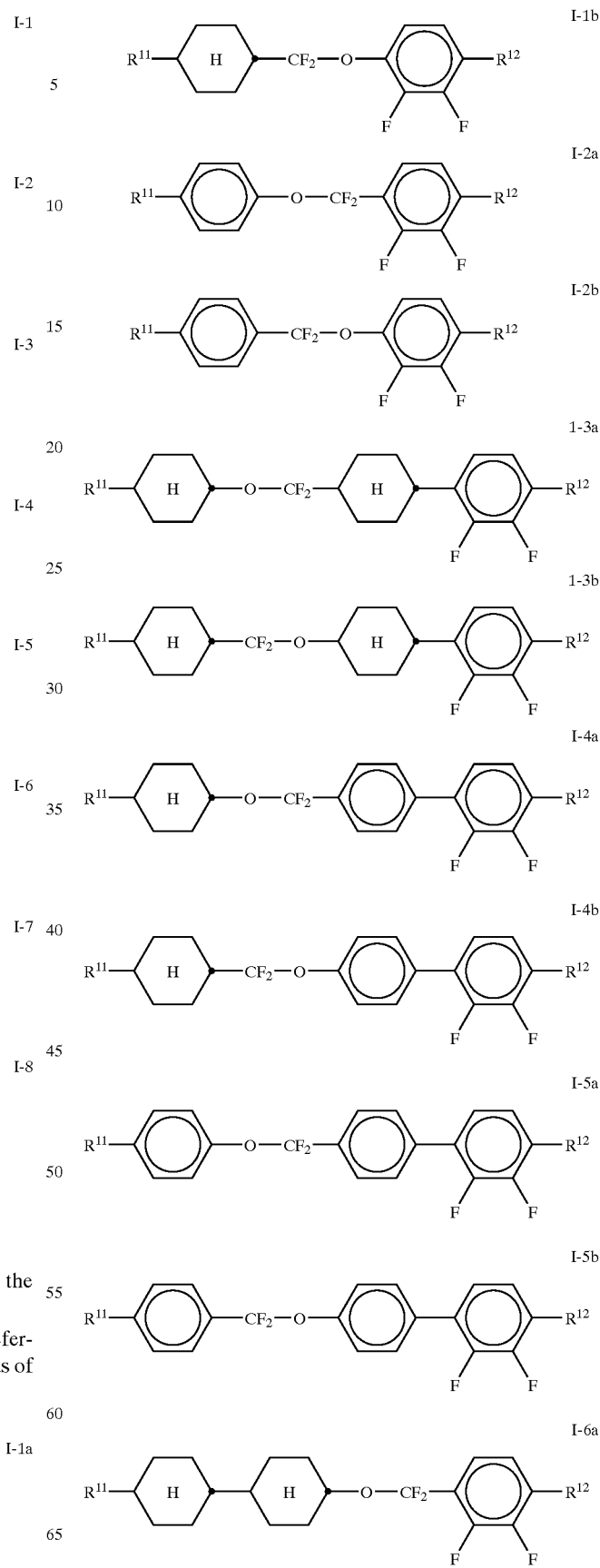
in which
$R^{11}$, $R^{12}$ and $Z^{12}$ are each as defined above under the formula I.
The compounds of the formula I are particularly preferably selected from the group consisting of the compounds of the following sixteen formulae I-1a to I-8b:

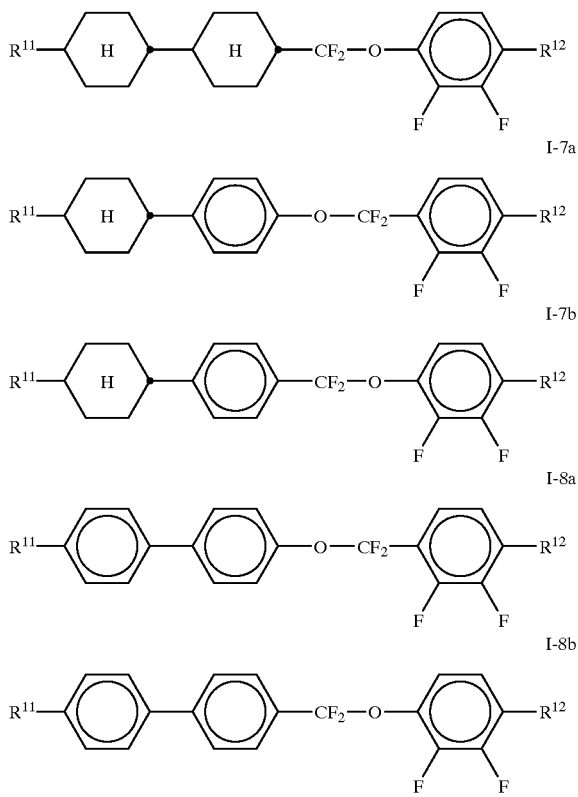

in which

R$^{11}$ and R$^{12}$ are as defined above under the formula I, and R$^{11}$ is preferably alkyl having from 1 to 7 carbon atoms or alkenyl having from 2 to 7 carbon atoms, and R$^{12}$ is preferably alkoxy having from 1 to 7 carbon atoms or alkenyloxy having from 2 to 7 carbon atoms.

The compounds are very particularly preferably selected from the group consisting of the compounds of the formulae I-1a, I-1b, I-2a, I-3a, I-4a, I-4b, I-5a, I-6a, I-6b and I-7a and in particular from the group consisting of the compounds of the formulae I-1b and I-7a.

In the present application, in connection with the quoting of the constituents of the compositions:

comprise means that the concentration of the relevant constituents in the composition is preferably 10% or more, particularly preferably 20% or more, consist predominantly of means that the concentration of the relevant constituents in the composition is preferably 50% or more, particularly preferably 55% or more and very particularly preferably 60% or more, consist essentially completely of means that the concentration of the relevant constituents in the composition is preferably 80% or more, particularly preferably 90% or more and very particularly preferably 95% or more, and consist virtually completely of means that the concentration of the relevant constituents in the composition is preferably 98% or more, particularly preferably 99% or more and very particularly preferably 100.0%.

This applies both to the media as compositions with their constituents, which may be components and compounds, and to the components with their constituents, those of the compounds.

The liquid-crystal media preferably comprise one or more compounds selected from the group consisting of the compounds of the formulae I-1, I-2 and I-4, particularly preferably of the formulae I-2 and/or I-4.

Component B preferably consists predominantly, particularly preferably consists essentially completely and very particularly preferably consists virtually completely, of one or more compounds selected from the group consisting of the compounds of the formulae II and III.

The compounds of the formula II are preferably selected from the group consisting of the compounds of the formulae II-1-1 to II-3

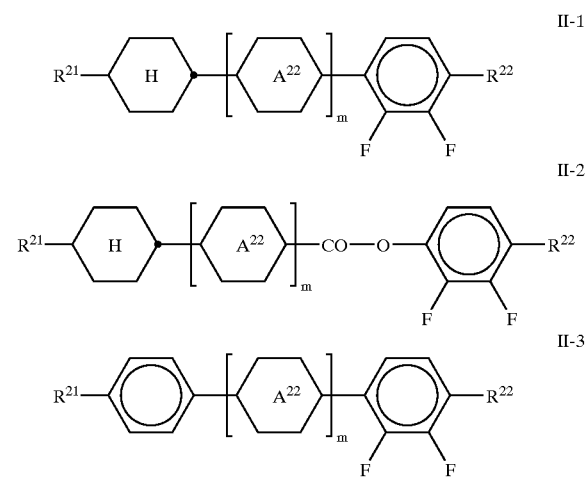

in which

R$^{21}$ and R$^{22}$ are as defined above under the formula I, and

R$^{21}$ is preferably n-alkyl having from 1 to 7 carbon atoms, n-alkoxy having from 1 to 7 carbon atoms or alkenyloxy having from 2 to 7 carbon atoms, and R$^{22}$ is preferably n-alkoxy having from 1 to 7 carbon atoms or alkenyloxy having from 2 to 7 carbon atoms, and in the formulae I2 and I3 is alternatively n-alkyl having from 1 to 7 carbon atoms, in which

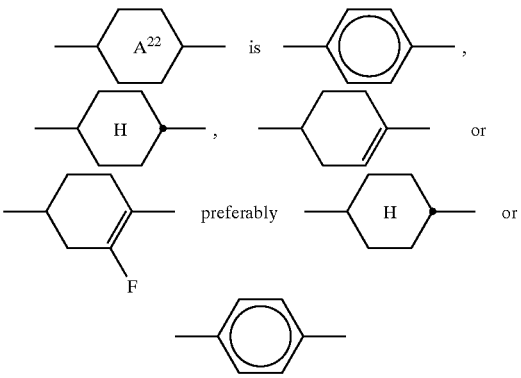

n is 0 or 1.

The compounds of the formula III are preferably selected from the group consisting of the compounds of the formulae III-1 and III-2:

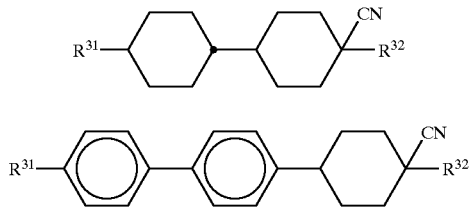

in which

R$^{31}$ and R$^{32}$ are as defined above under the formula III and are preferably n-alkyl.

The liquid-crystal media particularly preferably comprise one or more compounds selected from the group consisting of the compounds of the formulae II-1a to II-1f:

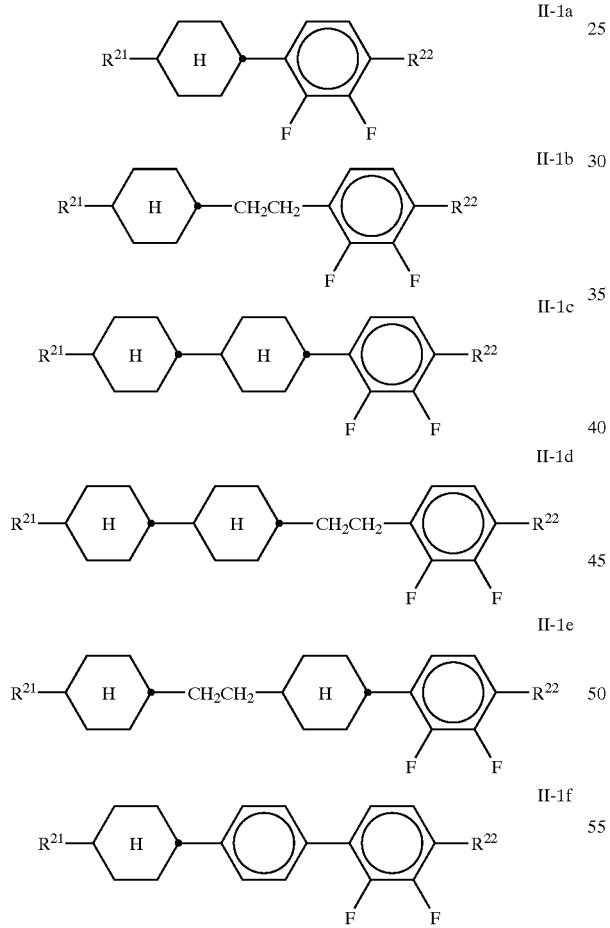

in which R$^{21}$ and R$^{22}$ are as defined above in case of the formula II and are preferably as defined above in the case of the formula II-1.

The liquid-crystal media particularly preferably comprise one or more compounds selected from the group consisting of the compounds of the formulae II-2a to II-2c:

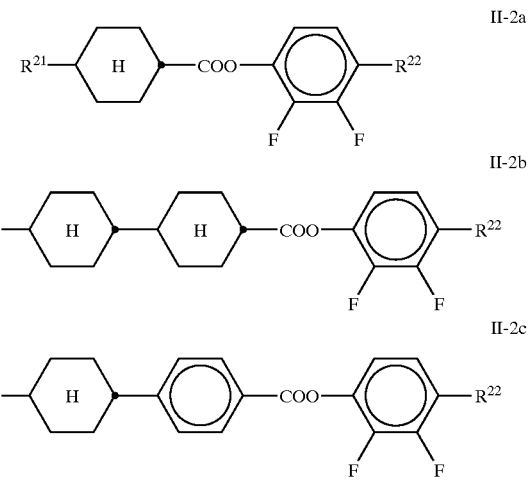

in which R$^{21}$ and R$^{22}$ are as defined above in the case of the formula II and are preferably as defined above in the case of the formula II-2.

The liquid-crystal media particularly preferably comprise one or more compounds of the formula II-3a

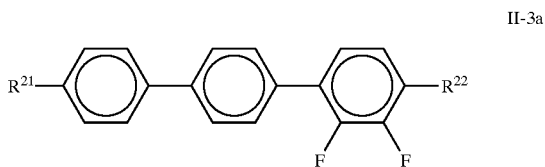

in which R$^{21}$ and R$^{22}$ are as defined above in the case of the formula II and are preferably as defined above in the case of the formula II-3.

Component C preferably consists predominantly, particularly preferably consists essentially completely and very particularly preferably consists virtually completely, of one or more compounds of the formula IV. These compounds of the formula IV are preferably selected from the group consisting of the compounds of the formulae IV-1 to IV-3:

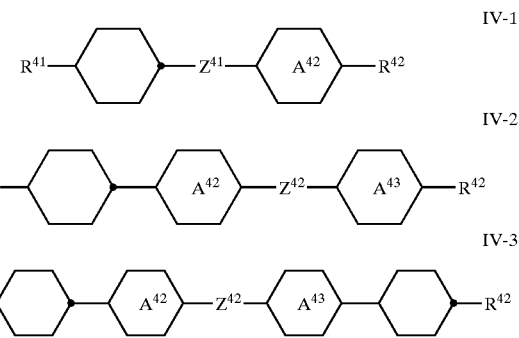

in which R$^{41}$, R$^{42}$, Z$^{41}$, Z$^{42}$,

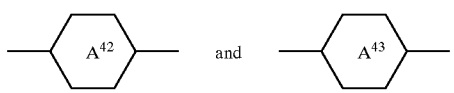

are each as correspondingly defined above in the case of the formula IV.

The liquid-crystal medium especially preferably comprises one or more compounds selected from the group consisting of the compounds of the formulae IV-1a to IV-1d, IV-1e, IV-2a to IV-2e and IV-3a to IV-3c:

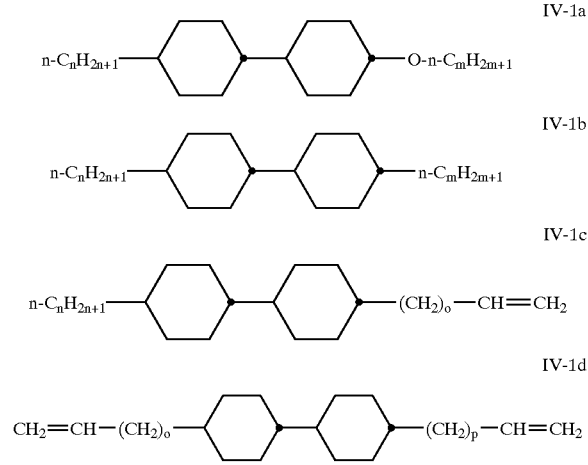

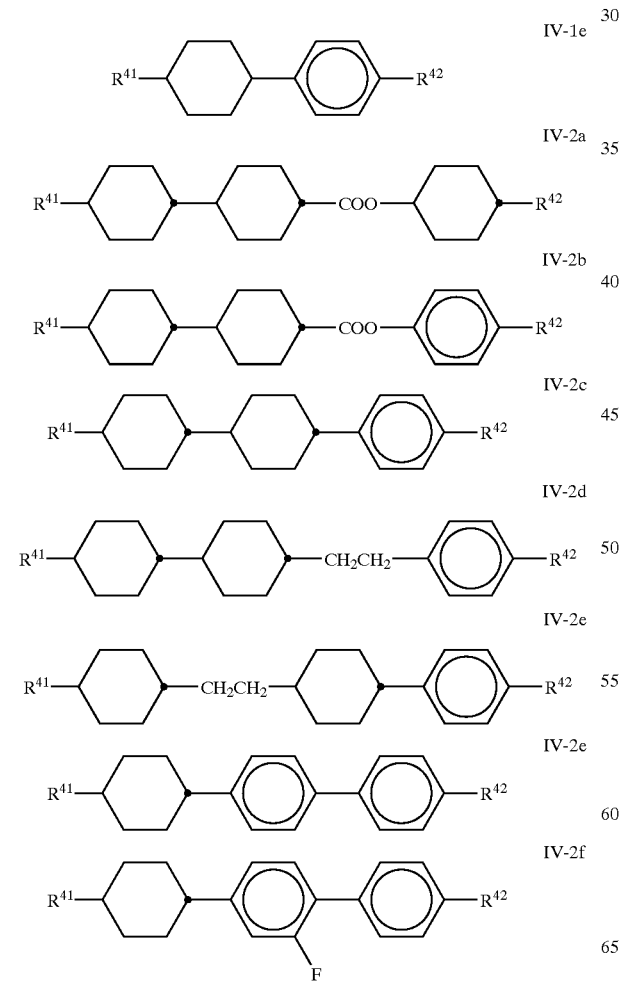

in which n and m are each, independently of one another, from 1 to 5, and o and p are each, independently thereof and from one another, from 0 to 3,

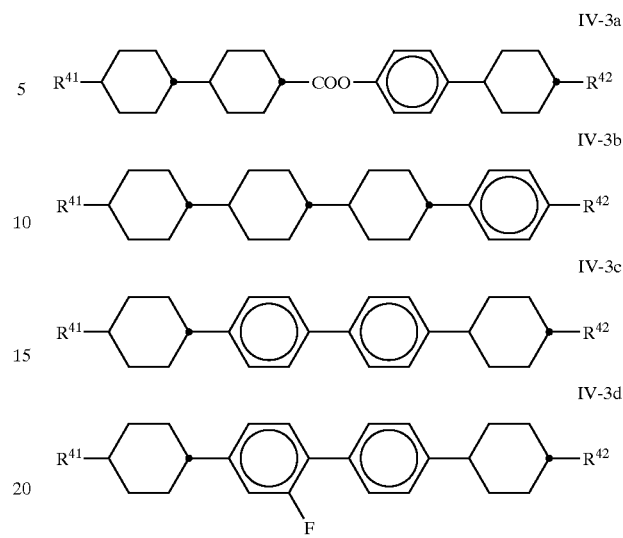

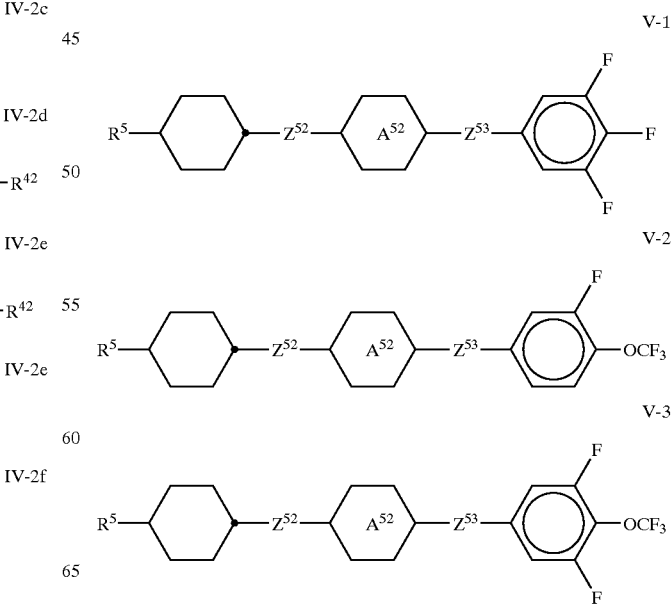

in which $R^{41}$ and $R^{42}$ are each as defined above under the formula IV1, and the phenyl rings may optionally be fluorinated, but not in such a way that the compounds are identical with those of the formula II and its sub-formulae. $R^{41}$ is preferably n-alkyl having from 1 to 5 carbon atoms, particularly preferably having from 1 to 3 carbon atoms, and $R^{42}$ is preferably n-alkyl or n-alkoxy having from 1 to 5 carbon atoms or alkenyl having from 2 to 5 carbon atoms. Of these, particular preference is given to the compounds of the formulae IV1a to IV1d.

Component D preferably consists predominantly, particularly preferably consists essentially completely and very particularly preferably consists virtually completely, of one or more compounds of the formula IV. These compounds of the formula IV are preferably selected from the group consisting of the compounds of the formulae V-1 to V-4:

-continued

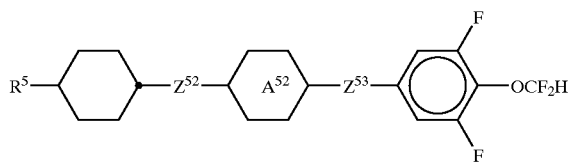
V-4 in which $R^5$, $Z^{52}$, $Z^{53}$ and

are as defined above for the formula V, but preferably
$R^5$ is alkyl having 1–7 carbon atoms or alkenyl having 2–7 carbon atoms, preferably vinyl or 1E-alkenyl,
one of
$Z^{52}$ and $Z^{53}$ is a single bond and the other is —CH$_2$CH$_2$—, —COO— or a single bond and

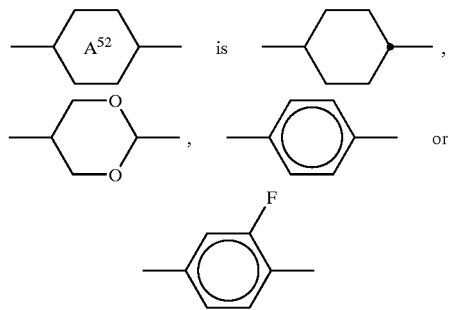

In a preferred embodiment, the medium comprises one or more compounds of the formula VI, preferably selected from the group consisting of the compounds of the formulae VI-1 to VI-4:

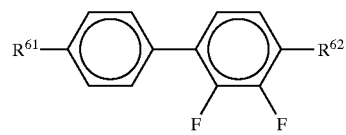
VI-1

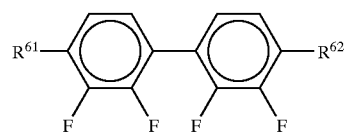
VI-2

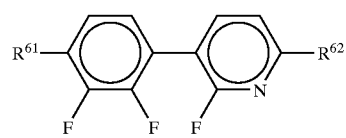
VI-3

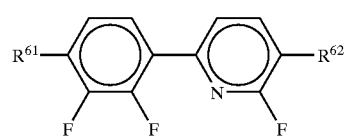
VI-4 in which $R^{61}$ and $R^{62}$ are as defined above in the case of the formula VI.

In a preferred embodiment, the medium comprises one or more compounds of the formula VII, preferably from the group consisting of the formula VII-1

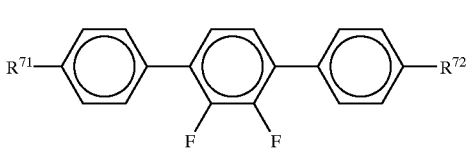
VII-1 in which
$R^{71}$ and $R^{72}$ are as defined above in the case of the formula VII.

In a preferred embodiment, the liquid-crystal media according to the invention comprise in total, based on the mixture as a whole, from 5% to 85%, preferably from 10% to 55% and particularly preferably from 15% to 40%, of component A, preferably of compounds of the formula I, from 5% to 85%, preferably from 10% to 85%, particularly preferably from 20% to 80% and very particularly preferably from 40% to 75%, of component B, preferably of compounds of the formulae II and III, where the ratio of the concentrations of compounds II and III is preferably greater than or equal to 2:1, particular preferably greater than or equal to 3:1 and very particularly preferably greater than or equal to 4:1, from 0% to 50%, preferably from 0% to 40%, particularly preferably from 0% to 30% and very particularly preferably from 5% to 25%, of component C, preferably of compounds of the formula IV, and from 0% to 40%, preferably from 0% to 30%, particularly preferably from 0% to 20%, and very particularly preferably from 1% to 15%, of component D, preferably of compounds of the formula IV.

Here, as throughout the present application, the term compounds, also written as compound(s), means both one and a plurality of compounds, unless explicitly stated otherwise.

The individual compounds are employed here in concentrations of in each case from 1% to 30%, preferably from 2% to 30% and particularly preferably from 4% to 16%. An exception is formed here by compounds having three phenyl rings and compounds having four six-membered rings. These compounds are employed in concentrations of in each case from 0.5% to 15%, preferably from 1% to 10% and particularly preferably from 1% to 8% per individual compound. In the case of compounds of the formula I in which n=0, the preferred limits to the concentrations for the proportion of the individual compounds in the medium are from 1% to 20%, preferably from 2% to 15% and particularly preferably from 5% to 8%. In the case of the compounds of the formula I in which n=1, the preferred limits to the concentrations for the proportion of the individual compounds in the medium are from 1% to 30%, preferably from 2% to 20% and particularly preferably from 8% to 12%.

In a preferred embodiment, the liquid-crystal media particularly preferably comprise in total from 10% to 40% of compounds of the formula I,
from 50% to 90% of compounds of the formulae II and III,
from 0% to 40% of compounds of the formula IV, and
from 0% to 20% of compounds of the formula V.

In this embodiment, the liquid-crystal media very particularly preferably comprise in total
from 15% to 35% of compounds of the formula I,
from 60% to 80% of compounds of the formulae II and III,
from 0% to 20% of compounds of the formula IV and
from 0% to 5% of compounds of the formula V.

In a particularly preferred embodiment, which may be identical and preferably is identical with the preferred embodiments described above for the preferred concentration ranges, the liquid-crystal media comprise:
one or more compounds of the formula I, preferably selected from the group consisting of the compounds of the formulae I-1b and I-7a, preferably in which $R^{11}$ is n-alkyl and $R^{12}$ is alkoxy, and
one or more compounds of the formula II-1, preferably
one or more compounds of the formula II-1a, and/or, preferably and,
one or more compounds of the formula II-1c, and/or, preferably and,
one or more compounds of the formula III-1, and/or, preferably and,
one or more compounds selected from the group consisting of the compounds of the formulae IV-1 to IV-4, preferably
one or more compounds of the formula IV-1 selected from the group consisting of the compounds of the formulae IV-1a to IV-1d, very particularly preferably selected from the group consisting of the formulae IV-1c and IV-1d and in particular of the formula IV-1c, and/or, preferably and,
one or more compounds of the formula IV-2c and/or IV-2e, and/or, preferably and,
one or more compounds of the formula IV-3c and/or IV-3d, and/or, preferably and,
one or more compounds of the formula IV-4, and/or
one or more compounds selected from the group consisting of the compounds of the fonmulae V to VII.

Particular preference is given here to liquid-crystal media which comprise
one or more compounds of the formula I, preferably selected from the group consisting of the compounds of the formulae I-1b and I-7a, preferably in which $R^{11}$ is n-alkyl and $R^{12}$ is alkoxy, and in particular in each case in concentrations of from 6% to 20% per compound, and/or
one or more compounds of the formula II-1a, in particular in each case in concentrations of from 4% to 18% per compound, and/or
one or more compounds of the formula II-1c, in particular in each case in concentrations of from 3% to 15% per compound, preferably in each case one or more compounds in which $R^{21}$ is alkyl having from 1 to 3 carbon atoms and $R^{22}$ is alkoxy having from 1 to 3 carbon atoms, and in which $R^{21}$ is alkyl having from 1 to 3 carbon atoms and $R^{22}$ is alkyl having from 1 to 3 carbon atoms, and/or
one or more compounds of the formula IV-1, preferably of the formulae IV-1b and/or IV-1c.

These media may, if desired, comprise one or more compounds selected from the group consisting of the compounds of the formulae V-1 to V4.

The liquid-crystal media according to the invention preferably have nematic phases of in each case from −20° C. to 70° C., particularly preferably from −30° C. to 80° C. and very particularly preferably from −40° C. to 90° C. and most preferably from −40° C. to 105° C.

The term "have a nematic phase" here means firstly that no smectic phase and no crystallisation are observed at low temperatures at the corresponding temperature and secondly also that no clearing occurs on heating from the nematic phase. The investigation at low temperatures is carried out in a flow viscometer at the corresponding temperature and checked by storage for at least 100 hours in test cells having a layer thickness corresponding to the electro-optical application. At high temperatures, the clearing point is measured in capillaries by conventional methods.

Furthermore, the liquid-crystal media according to the invention are characterised by relatively low optical anisotropy values. The birefringence values are preferably in the range from 0.060 to 0.150, particularly preferably in the range from 0.070 to 0.120 and very particularly preferably in the range from 0.070 to 0.110.

In addition, the liquid-crystal media according to the invention have relatively low values for the threshold voltage ($V_0$) of less than or equal to 2.2 V, preferably less than or equal to 2.0 V, particularly preferably less than or equal to 1.9 V and very particularly preferably less than or equal to 1.85 V. In a particularly preferred embodiment, the liquid-crystal media according to the invention have values for the threshold voltage which are less than or equal to 1.5 V.

These preferred values for the individual physical properties are also observed in each case in combination with one another.

Independently of the above-mentioned dimensioning limits for the compounds of the formulae I, II and III, compounds of the formulae I and II are employed in the liquid-crystal media in accordance with the present invention in a concentration of up to about 25% per individual substance, and compounds of the formula III are employed in a concentration of up to about 20%, preferably up to 16%, per individual substance. Compounds of the formula I-1 are preferably employed in concentrations of up to about 20%, preferably up to 15%, per individual substance.

In the present application, "$\leq$" means less than or equal to, preferably less than, and "$\geq$" means greater than or equal to, preferably greater than.

In the present application,

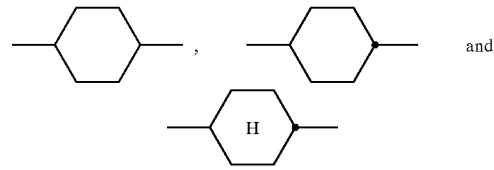

denote trans-1,4-cyclohexylen.

In the present application, the term dielectrically positive compounds means compounds having a $\Delta\varepsilon$ of >1.5, dielectrically neutral compounds means those in which $-1.5 \leq \Delta\varepsilon \leq 1.5$, and dielectrically negative compounds means those having a $\Delta\varepsilon < -1.5$. The dielectric anisotropy of the compounds is determined here by dissolving 10% of the compounds in a liquid-crystalline host and determining the capacitance of this mixture at 1 kHz in at least one test cell having a thickness of 20 μm with a homeotropic surface alignment and in at least one test cell having a thickness of 20 μm with a homogeneous surface alignment. The measurement voltage is typically from 0.5 V to 1.0 V, but is always less than the capacitive threshold of the respective liquid-crystal mixture.

The host mixture used for dielectrically positive and dielectrically neutral compounds is ZLI-4792 and the host mixture used for dielectrically negative compounds is ZLI-2857, both from Merck KGAA, Germany. The change in the dielectric constants of the host mixture after addition of the compound to be investigated and extrapolation to 100% of the compound employed gives the values for the respective compounds to be investigated.

The term threshold voltage usually relates to the optical threshold for 10% relative contrast ($V_{10}$), unless explicitly stated otherwise.

In relation to the liquid-crystal mixtures of negative dielectric anisotropy, however, the term threshold voltage in the present application is used for the capacitive threshold voltage ($V_0$), also known as the Freedericksz threshold, unless explicitly stated otherwise.

All concentrations in this application, unless explicitly stated otherwise, are given in per cent by weight and relate to the corresponding mixture or mixture component. All physical properties are and have been determined in accordance with "Merck Liquid Crystals, Physical Properties of Liquid Crystals", status November 1997, Merck KGaA, Germany, and apply to a temperature of 20° C., unless explicitly stated otherwise. An is determined at 589 nm and $\Delta\epsilon$ at 1 kHz.

In the case of the liquid crystal media of negative dielectric anisotropy, the threshold voltage was determined as the capacitive threshold $V_0$ (also known as the Freedericksz threshold) in test cells produced at Merck KgaA, Germany, with a liquid-crystal aligned homeotropically by means of lecithin.

The liquid-crystal media according to the invention may, if necessary, also comprise further additives and chiral dopants in the conventional amounts. The amount of these additives employed is in total from 0% to 10%, based on the amount of the mixture as a whole, preferably from 0.1% to 6%. The concentrations of the individual compounds employed are preferably from 0.1 to 3%. The concentration of these and similar additives is not taken into account when indicating the concentrations and the concentration ranges of the liquid-crystal compounds in the liquid-crystal media.

The compositions consist of a plurality of compounds, preferably from 3 to 30, particularly preferably from 6 to 20 and very particularly preferably from 10 to 16 compounds, which are mixed in a conventional manner. In general, the desired amount of the components used in smaller amount is dissolved in the components making up the principal constituent, advantageously at elevated temperature. If the selected temperature is above the clearing point of the principal constituent, the completion of the dissolution process is particularly easy to observe. However, it is also possible to prepare the liquid-crystal mixtures in other conventional ways, for example using premixes or from a so-called "multibottle system".

By means of suitable additives, the liquid-crystal phases according to the invention can be modified in such a way that they can be employed in any type of ECB, VAN, IPS, GH or ASM-PA LCD display that has been disclosed hitherto.

The entire disclosure[s] of all applications, patents and publications, cited above or below, and of corresponding German application No.10063943.7, filed Dec. 20, 2000, is hereby incorporated by reference.

EXAMPLES

The examples below serve to illustrate the invention without representing a limitation. In the examples, the melting point T (C,N), the transition from the smectic (S) phase to the nematic (N) phase T(S,N) and the clearing point T (N,I) of a liquid-crystal substance are indicated in degrees Celsius.

Unless explicitly stated otherwise, the percentages above and below are per cent by weight, and the physical properties are the values at 20° C., unless explicitly stated otherwise.

All the indicated values for temperatures in this application are ° C and all temperature differences are correspondingly differential degrees, unless explicitly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a hyphen, by a code for the substituents $R^1$, $R^2$, $L^1$ and $L^2$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| nmFF | $C_nH_{2n+1}$ | $C_mH_{2m+1}$ | H | F | F |
| nmOFF | $C_nH_{2n+1}$ | $OC_mH_{2m+1}$ | H | F | F |
| n | $C_nH_{2n+1}$ | CN | H | H | H |
| nN.F | $C_nH_{2n+1}$ | CN | F | H | H |
| nN.F.F | $C_nH_{2n+1}$ | CN | F | F | H |
| nF | $C_nH_{2n+1}$ | F | H | H | H |
| nF.F | $C_nH_{2n+1}$ | F | F | H | H |
| nF.F.F | $C_nH_{2n+1}$ | F | F | F | H |
| nOF | $OC_nH_{2n+1}$ | F | H | H | H |
| nCl | $C_nH_{2n+1}$ | Cl | H | H | H |
| nCl.F | $C_nH_{2n+1}$ | Cl | F | H | H |
| nCl.F.F | $C_nH_{2n+1}$ | Cl | F | F | H |
| $nCF_3$ | $C_nH_{2n+1}$ | $CF_3$ | H | H | H |
| $nCF_3$.F | $C_nH_{2n+1}$ | $CF_3$ | F | H | H |
| $nCF_3$.F.F | $C_nH_{2n+1}$ | $CF_3$ | F | F | H |
| $nOCF_3$ | $C_nH_{2n+1}$ | $OCF_3$ | H | H | H |
| $nOCF_3$.F | $C_nH_{2n+1}$ | $OCF_3$ | F | H | H |
| $nOCF_3$.F.F | $C_nH_{2n+1}$ | $OCF_3$ | F | F | H |
| $nOCF_2$ | $C_nH_{2n+1}$ | $OCHF_2$ | H | H | H |
| $nOCF_2$.F | $C_nH_{2n+1}$ | $OCHF_2$ | F | H | H |
| $nOCF_2$.F.F | $C_nH_{2n+1}$ | $OCHF_2$ | F | F | H |
| nS | $C_nH_{2n+1}$ | NCS | H | H | H |
| nS.F | $C_nH_{2n+1}$ | NCS | F | H | H |
| nS.F.F | $C_nH_{2n+1}$ | NCS | F | F | H |
| rVsN | $C_rH_{2r+1}$—CH=CH—$C_sH_{2s}$— | CN | H | H | H |
| rEsN | $C_rH_{2r+1}$—O—$C_sH_{2s}$— | CN | H | H | H |

TABLE A
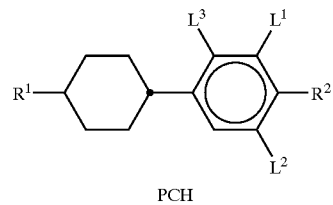
PCH
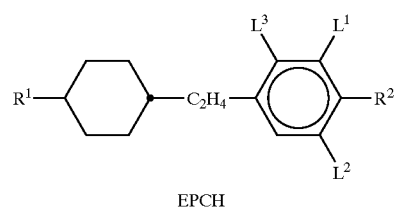
EPCH
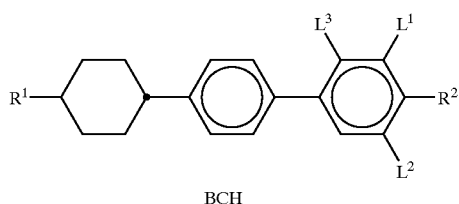
BCH
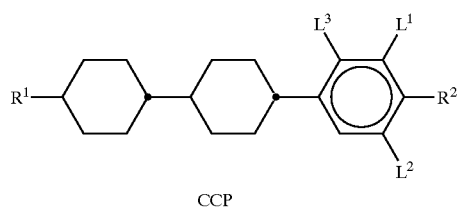
CCP
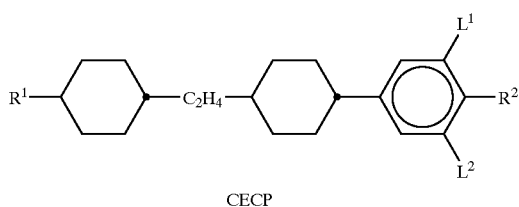
CECP
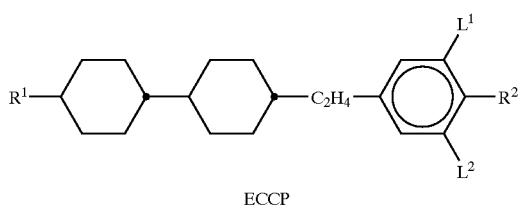
ECCP
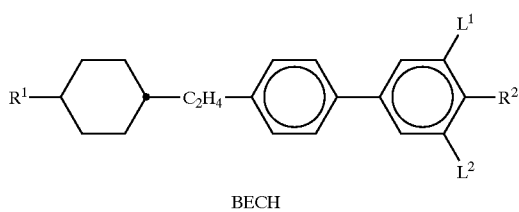
BECH TABLE A-continued
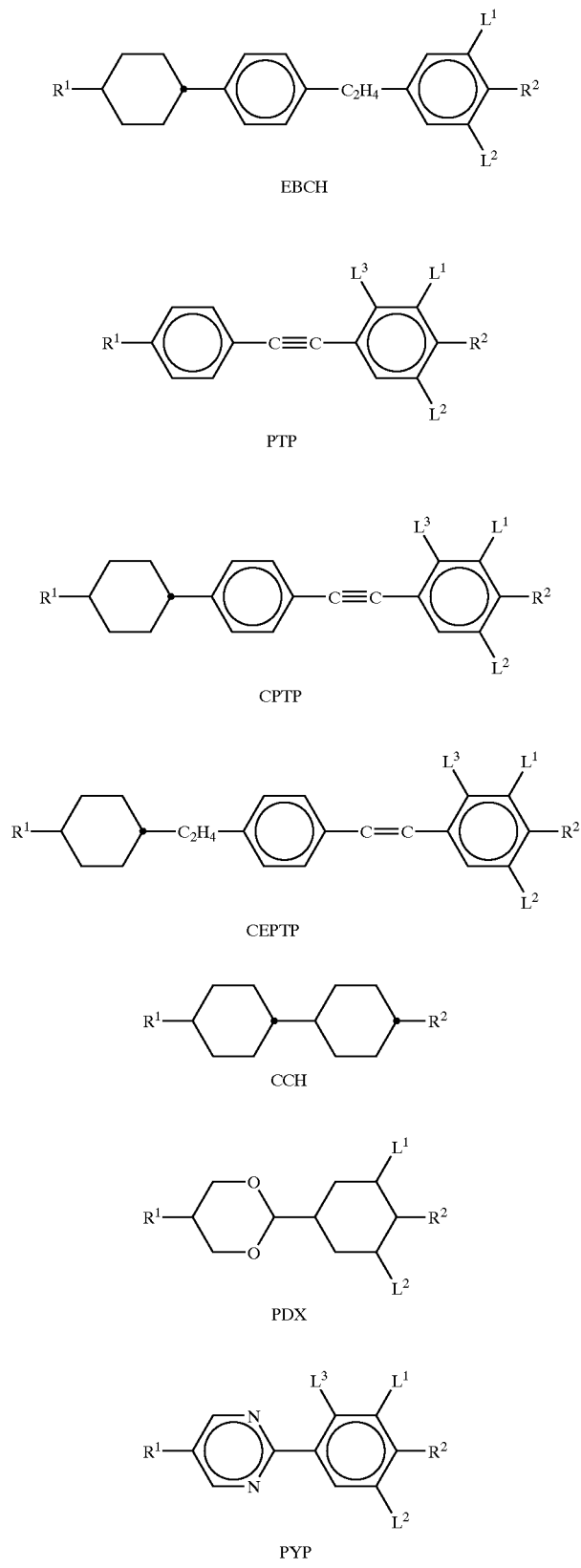

TABLE A-continued
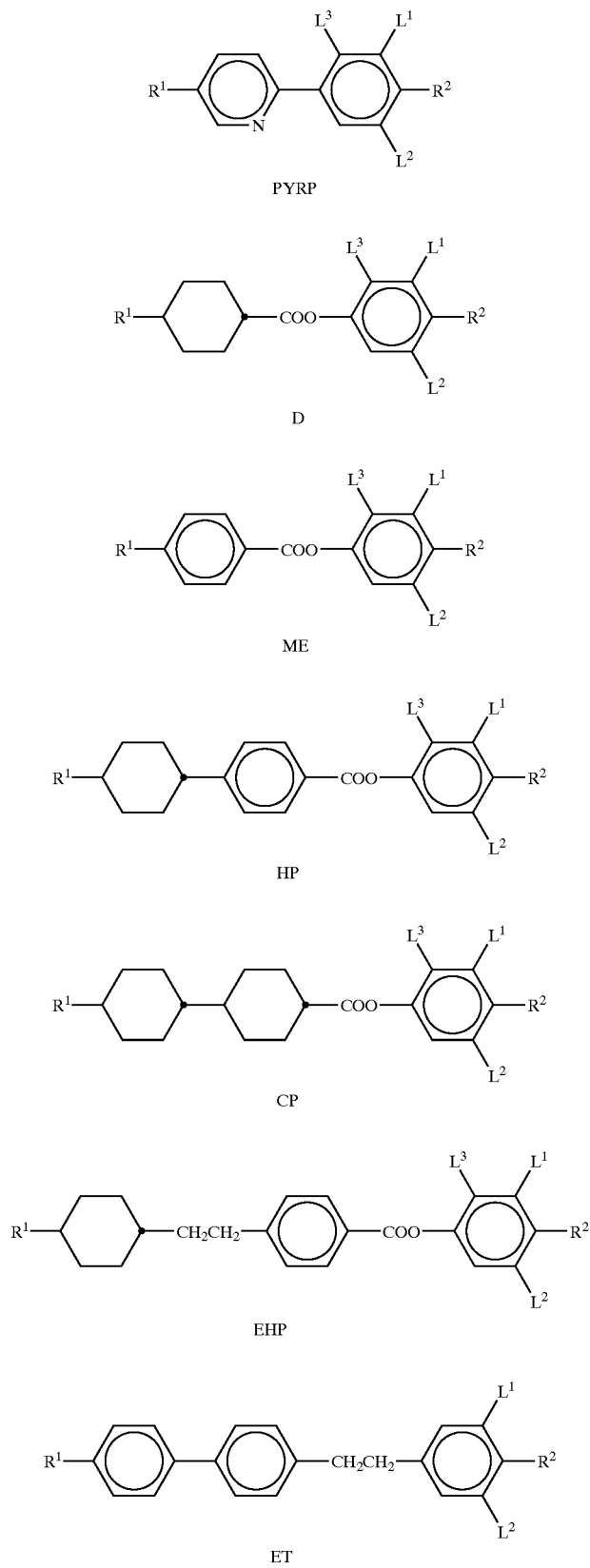

TABLE A-continued
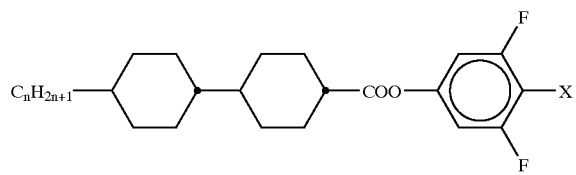
CCZU-n-X
(X = F, Cl or OCF$_3$)
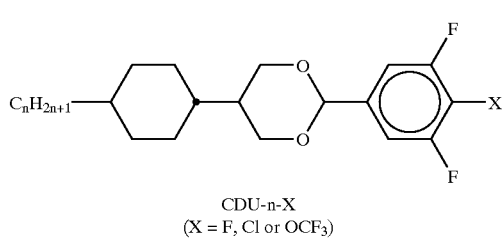
CDU-n-X
(X = F, Cl or OCF$_3$)
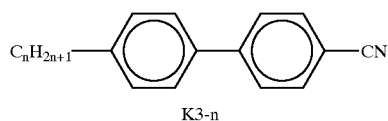
K3-n
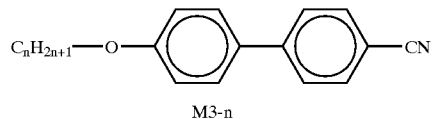
M3-n
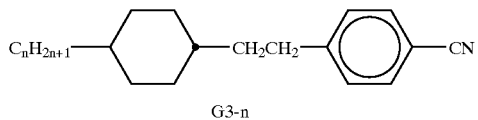
G3-n
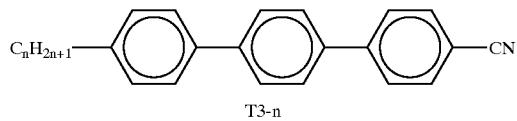
T3-n
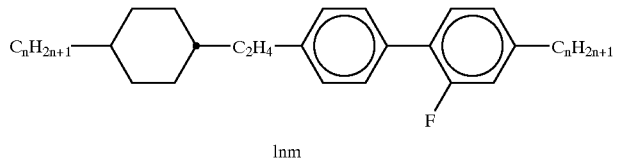
Inm
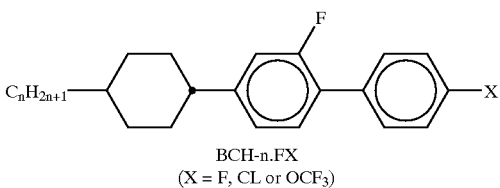
BCH-n.FX
(X = F, CL or OCF$_3$)

TABLE A-continued
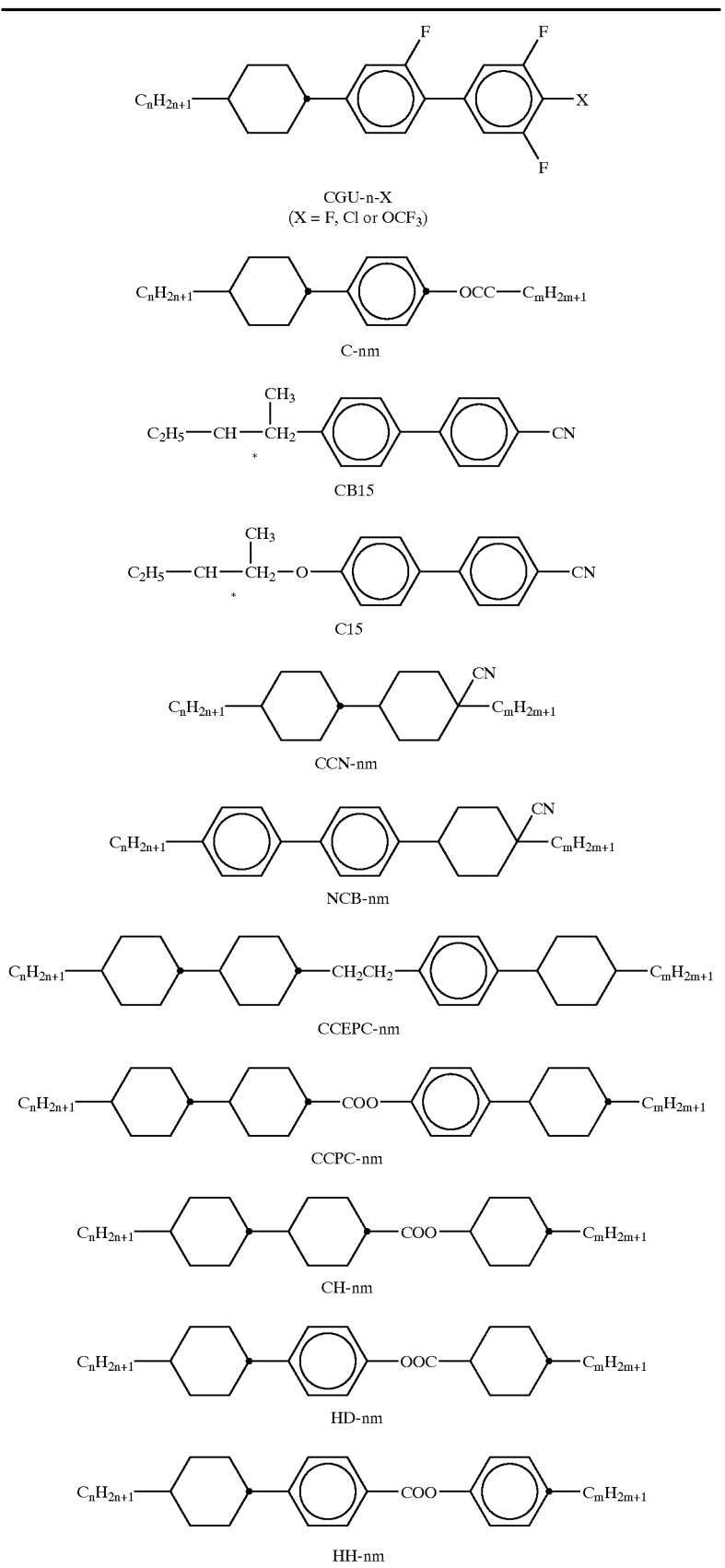

TABLE A-continued
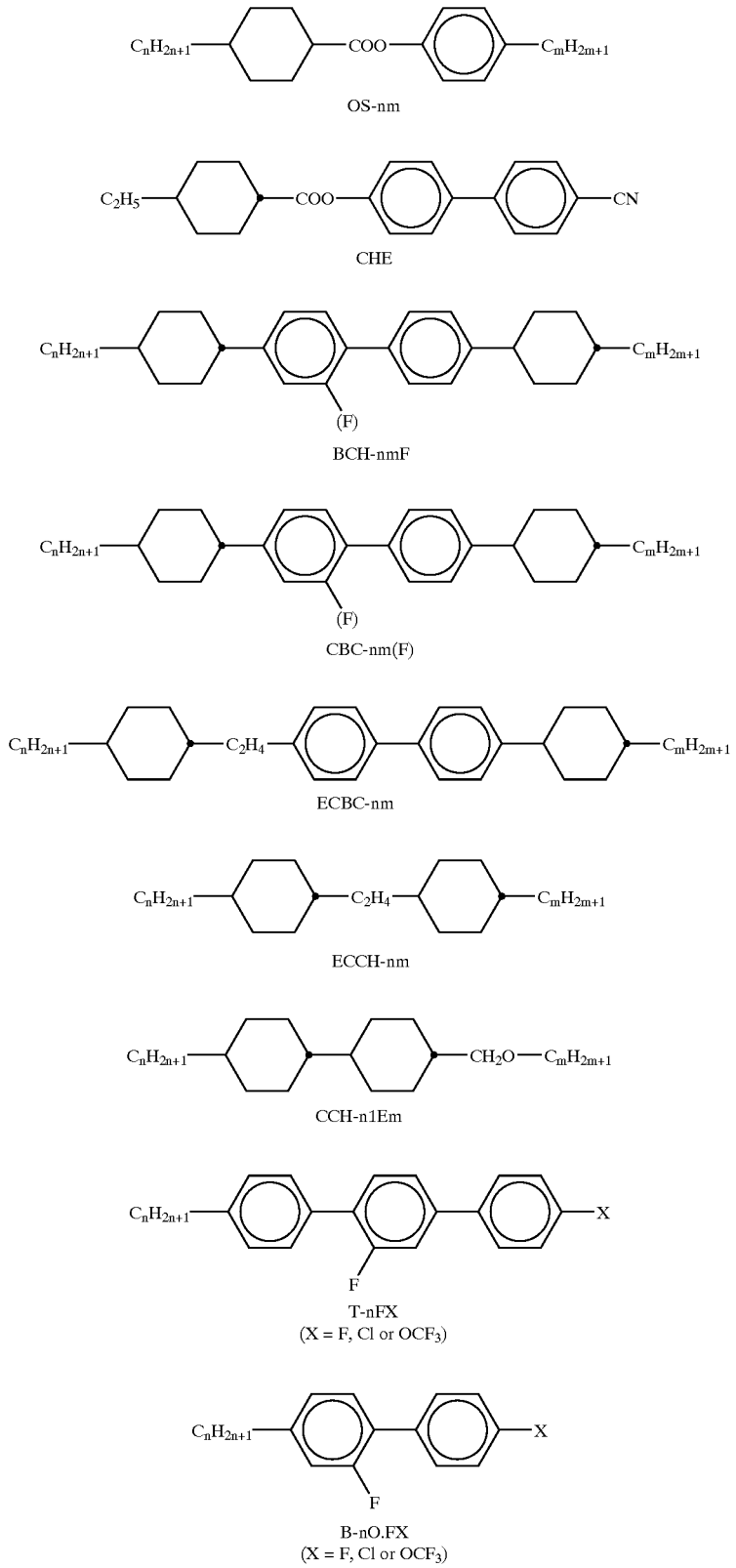

TABLE A-continued
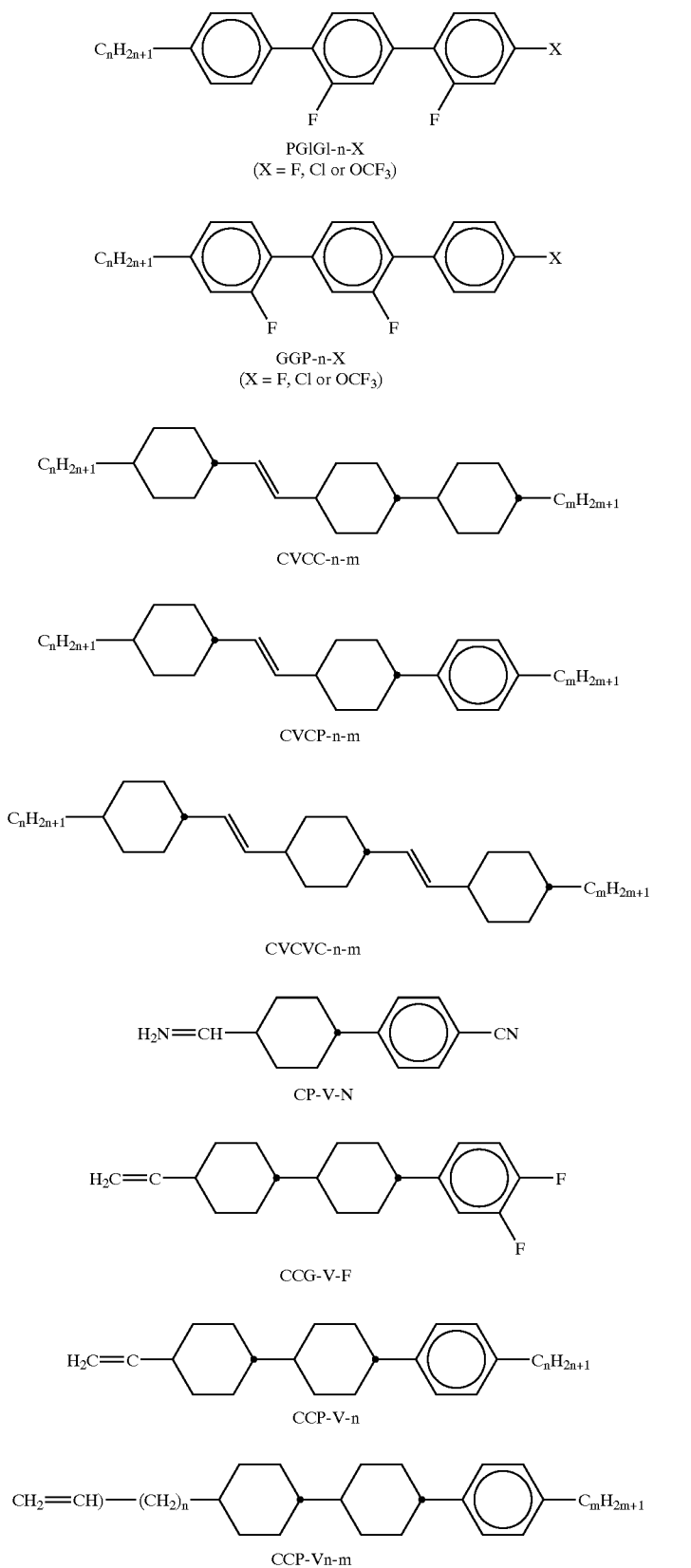

TABLE A-continued
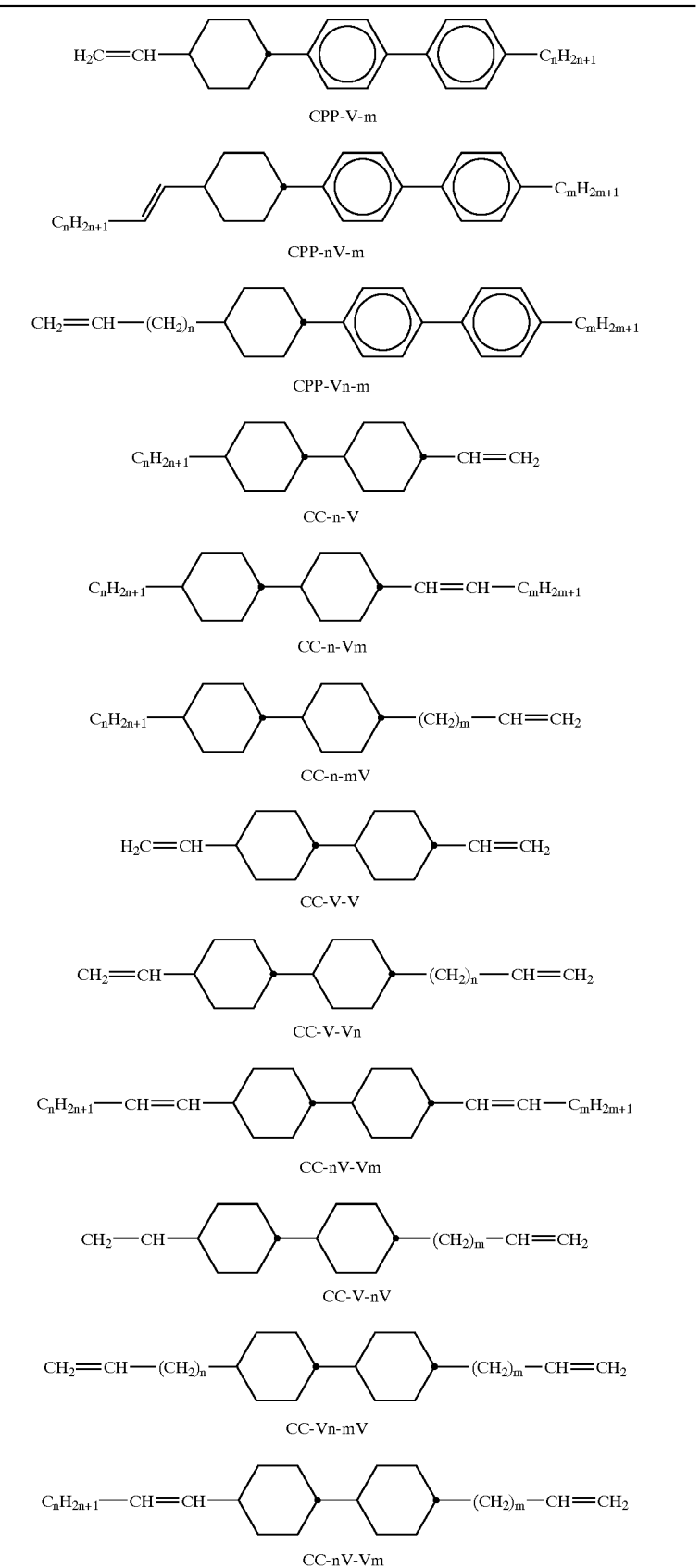

TABLE A-continued
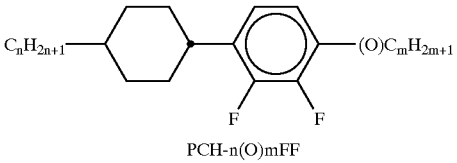
PCH-n(O)mFF
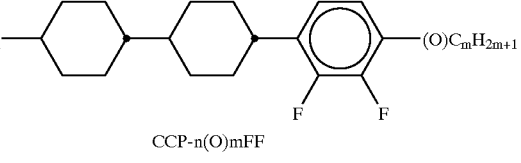
CCP-n(O)mFF
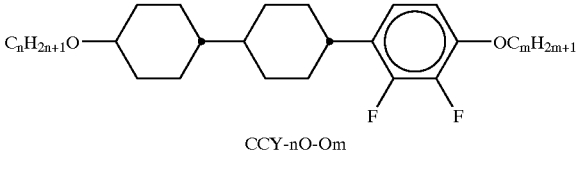
CCY-nO-Om
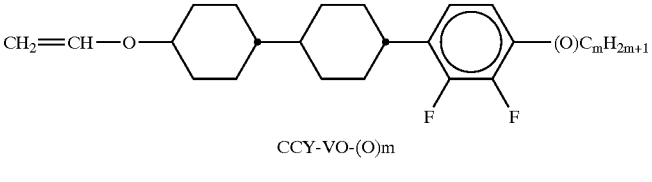
CCY-VO-(O)m
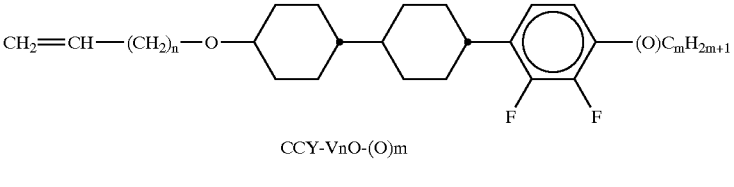
CCY-VnO-(O)m
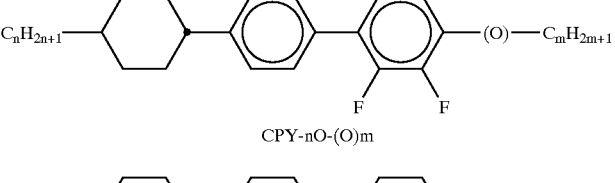
CPY-nO-(O)m
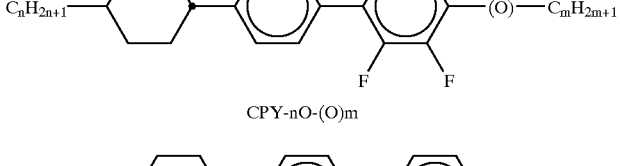
CPY-nO-(O)m
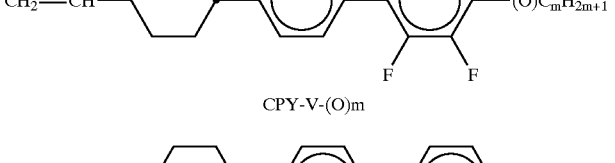
CPY-V-(O)m
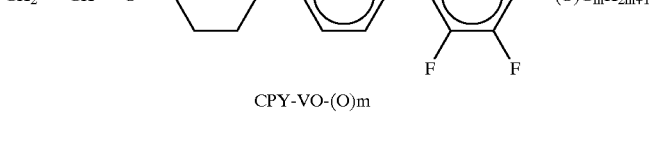
CPY-VO-(O)m TABLE A-continued
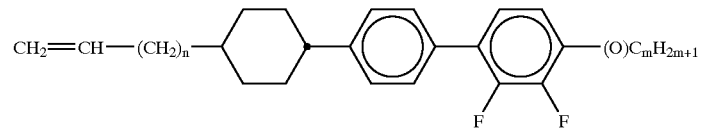
CPY-Vn-(O)m
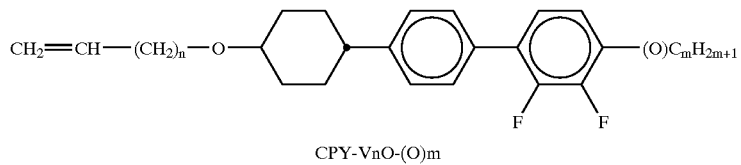
CPY-VnO-(O)m
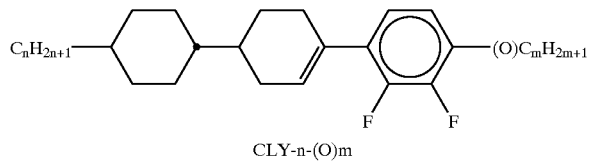
CLY-n-(O)m
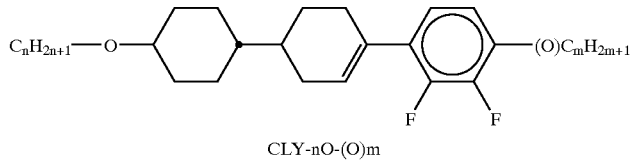
CLY-nO-(O)m
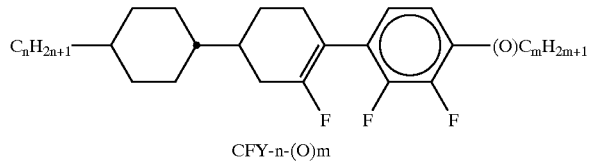
CFY-n-(O)m
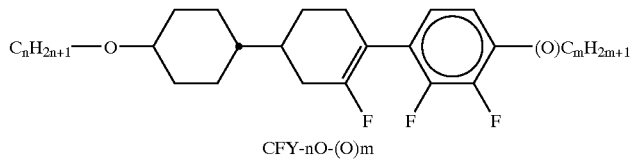
CFY-nO-(O)m
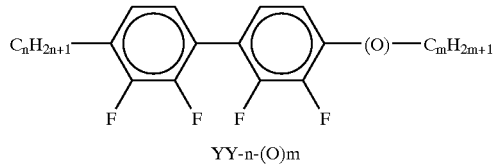
YY-n-(O)m
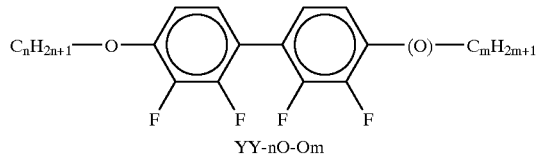
YY-nO-Om
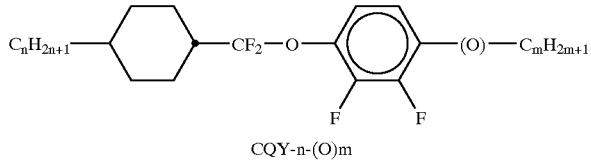
CQY-n-(O)m

TABLE A-continued

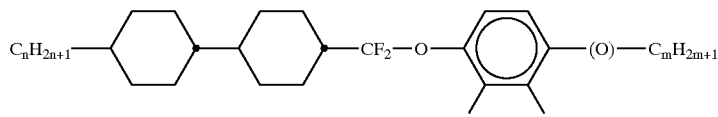

CCQY-n-(O)m

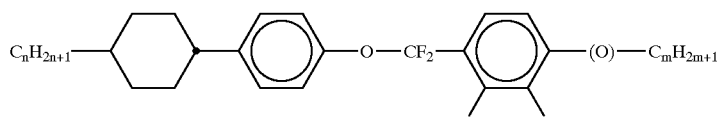

CPQlY-n-(O)m

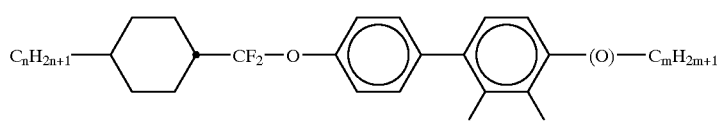

CQPY-n-(O)m

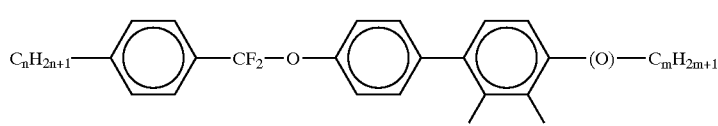

PQPY-n-(O)m

The following examples are intended to illustrate the invention without representing a limitation. Above and below, percentages are per cent by weight. All temperatures are indicated in degrees Celsius. An denotes optical anisotropy (589 nm, 20° C.), Δ∈ denotes the dielectric anisotropy (1 kHz, 20° C.), H.R. denotes the voltage holding ratio (at 100° C., after 5 minutes in the oven, 1 V), and $V_0$, the threshold voltage, was determined at 20° C.

EXAMPLE 1

| Compound/ abbreviation | Concentration/ % by weight | Physical properties | |
|---|---|---|---|
| CPQIY-3-O2 | 10.0 | T(N,I) = | 105.5° C. |
| CPQIY-3-O4 | 10.0 | $n_e$ (20° C., 589 nm) = | 1.5822 |
| CPQIY-5-O4 | 10.0 | Δn (20° C., 589 nm) = | 0.1001 |
| PCH-304FF | 9.0 | $\epsilon_\perp$ (20° C., 1 kHz) = | 8.3 |
| PCH-504FF | 9.0 | Δ∈ (20° C., 1 kHz) = | −4.6 |
| CCP-202FF | 4.0 | $\gamma_1$ (20° C.) = | 271 mPa · s |
| CCP-302FF | 6.0 | $t_{store}$ (−40° C.) = | >1000 h |
| CCP-502FF | 6.0 | VHR (5 min, 100° C.) = | 89% |
| CCP-21FF | 7.0 | $V_0$ (20° C.) = | 2.25 V |
| CCP-31FF | 10.0 | | |
| CCP-V-1 | 9.0 | | |
| CC-3-V1 | 10.0 | | |
| Σ | 100.0 | | |

The liquid-crystal medium is introduced into a VA display with TFT addressing. This display is distinguished, in particular, by the fact that it can be employed in a very large temperature range, as required for so-called broad range applications, for example in mobile telephones and in navigation systems.

EXAMPLE 2

| Compound/ abbreviation | Concentration/ % by weight | Physical properties | |
|---|---|---|---|
| CPQIY-3-O2 | 10.0 | T(N,I) = | 71.5° C. |
| CPQIY-3-O4 | 6.0 | $n_e$ (20° C., 589 nm) = | 1.5773 |
| CPQIY-5-O4 | 8.0 | Δn (20° C., 589 nm) = | 0.0947 |
| D-302FF | 20.0 | $\epsilon_\perp$ (20° C., 1 kHz) = | 11.7 |
| D-502FF | 20.0 | Δ∈ (20° C., 1 kHz) = | −7.5 |
| PCH-502FF | 14.0 | $\gamma_1$ (20° C.) = | 268 mPa · s |
| PCH-504FF | 11.0 | $t_{store}$ (−20° C.) = | >1000 h |
| CCP-302FF | 5.0 | $t_{store}$ (−40° C.) = | ≧500 h |
| CCP-502FF | 6.0 | $V_0$ (20° C.) = | 1.45 V |
| Σ | 100.0 | | |

As in Example 1, the liquid-crystal medium is introduced into a display having TFT addressing, but here into an IPS display. This display is distinguished, in particular, by a very low addressing voltage.

EXAMPLE 3

| Compound/ abbreviation | Concentration/ % by weight | Physical properties | |
|---|---|---|---|
| CPQIY-3-O4 | 8.0 | T(N,I) = | 71.0° C. |
| CPQIY-5-O4 | 8.0 | $n_e$ (20° C., 589 nm) = | 1.5788 |
| CCQY-5-O2 | 5.3 | Δn (20° C., 589 nm) = | 0.1007 |
| PCH-304FF | 19.0 | $\epsilon_\perp$ (20° C., 1 kHz) = | 8.5 |
| PCH-502FF | 9.0 | Δ∈ (20° C., 1 kHz) = | −4.4 |
| PCH-504FF | 14.0 | $\gamma_1$ (20° C.) = | 219 mPa · s |
| CCP-302FF | 13.7 | $k_1$ (20° C.) = | 11.8 pN |
| BCH-32 | 8.0 | $k_1/k_3$ (20° C.) = | 1.24 |

EXAMPLE 3-continued

| Compound/ abbreviation | Concentration/ % by weight | Physical properties | |
|---|---|---|---|
| CC-5-V | 3.0 | $t_{store}$ (−30° C.) | >1000 h |
| CC-3-V1 | 8.0 | $t_{store}$ (−40° C.) | >1000 h |
| PGIGI-3-F | 4.0 | $V_0$ (20° C.) = | 1.92 V |
| Σ | 100.0 | | |

As in Example 1, the liquid-crystal-medium is introduced into a VA display with TFT addressing.

EXAMPLE 4

| Compound/ abbreviation | Concentration/ % by weight | Physical properties | |
|---|---|---|---|
| CCQY-5-O2 | 7.0 | T(N,I) = | 99.0° C. |
| PCH-304FF | 12.0 | $n_e$ (20° C., 589 nm) = | 1.5825 |
| PCH-502FF | 9.0 | Δn (20° C., 589 nm) = | 0.1003 |
| PCH-504FF | 13.0 | $\epsilon_\perp$ (20° C., 1 kHz) = | 8.1 |
| CCP-302FF | 11.0 | Δε (20° C., 1 kHz) = | −4.4 |
| CCP-502FF | 9.0 | $\gamma_1$ (20° C.) = | 266 mPa · s |
| CCP-21FF | 7.0 | $k_1$ (20° C.) = | 16.7 pN |
| CCP-31FF | 11.0 | $k_1/k_3$ (20° C.) = | 1.13 |
| BCH-32 | 8.0 | $t_{store}$ (−30° C.) | >1000 h |
| CCP-V-1 | 10.0 | $t_{store}$ (−40° C.) | ≧300 h |
| CC-3-V1 | 3.0 | $V_0$ (20° C.) = | 2.21 V |
| Σ | 100.0 | | |

As in Example 1, the liquid-crystal medium is introduced into a VA display with TFT addressing. This display is distinguished, in particular, by the fact that it can be employed in a very large temperature range, as required for so-called broad range applications, for example in mobile telephones and in navigation systems.

EXAMPLE 5

| Compound/ abbreviation | Concentration/ % by weight | Physical properties | |
|---|---|---|---|
| CPQIY-3-O4 | 10.0 | T(N,I) = | 70.5° C. |
| CPQIY-5-O4 | 10.0 | $n_e$ (20° C., 589 nm) = | 1.5785 |
| PCH-304FF | 17.0 | Δn (20° C., 589 nm) = | 0.0993 |
| PCH-502FF | 9.0 | $\epsilon_\perp$ (20° C., 1 kHz) = | 8.1 |
| PCH-504FF | 14.0 | Δε (20° C., 1 kHz) = | −4.2 |
| CPY-2-O2 | 7.0 | $\gamma_1$ (20° C.) = | 187 mPa · s |
| CPY-3-O2 | 7.0 | $k_1$ (20° C.) = | 11.5 pN |
| CCP-V-1 | 12.0 | $k_1/k_3$ (20° C.) = | 1.24 |
| CCH-35 | 5.0 | $t_{store}$ (−30° C.) | >1000 h |
| CC-3-V1 | 9.0 | $t_{store}$ (−40° C.) | ≧300 h |
| Σ | 100.0 | $V_0$ (20° C.) = | 1.95 V |

As in Example 1, the liquid-crystal medium is introduced into a VA display with TFT addressing.

EXAMPLE 6

| Compound/ abbreviation | Concentration/ % by weight | Physical properties | |
|---|---|---|---|
| PQPY-5-O4 | 14.0 | T(N,I) = | 71.0° C. |
| PCH-304FF | 16.0 | $n_e$ (20° C., 589 nm) = | 1.5812 |
| PCH-502FF | 12.0 | Δn (20° C., 589 nm) = | 0.1023 |
| PCH-504FF | 3.0 | $\epsilon_\perp$ (20° C., 1 kHz) = | 6.9 |
| CPY-2-O2 | 7.0 | Δε (20° C., 1 kHz) = | −3.3 |
| CPY-3-O2 | 7.0 | $\gamma_1$ (20° C.) = | 108 mPa · s |
| CCP-V-1 | 4.0 | $t_{store}$ (−30° C.) | >1000 h |
| BCH-32 | 7.0 | $t_{store}$ (−40° C.) | >1000 h |

EXAMPLE 6-continued

| Compound/ abbreviation | Concentration/ % by weight | Physical properties | |
|---|---|---|---|
| CCH-35 | 5.0 | $V_0$ (20° C.) = | 2.10 V |
| CC-3-V | 4.0 | | |
| CC-5-V | 11.0 | | |
| CC-3-V1 | 10.0 | | |
| Σ | 100.0 | | |

As in Example 1, the liquid-crystal medium is introduced into a VA display with TFT addressing. This display exhibits, in particular, very short response times.

EXAMPLE 7

| Compound/ abbreviation | Concentration/ % by weight | Physical properties | |
|---|---|---|---|
| PQPY-5-1 | 10.0 | T(N,I) = | 72.0° C. |
| PCH-304FF | 18.0 | $n_e$ (20° C., 589 nm) = | 1.5890 |
| PCH-502FF | 12.0 | Δn (20° C., 589 nm) = | 0.1054 |
| PCH-504FF | 4.0 | $\epsilon_\perp$ (20° C., 1 kHz) = | 6.9 |
| CCP-31FF | 6.0 | Δε (20° C., 1 kHz) = | −3.3 |
| CPY-2-O2 | 4.0 | $\gamma_1$ (20° C.) = | 112 mPa · s |
| CPY-V-O2 | 10.0 | $t_{store}$ (−30° C.) | >1000 h |
| CCP-V-1 | 7.0 | $t_{store}$ (−40° C.) | >1000 h |
| CCP-V2-1 | 3.0 | $V_0$ (20° C.) = | 2.14 V |
| BCH-32 | 6.0 | | |
| CC-3-V | 9.0 | | |
| CC-3-2V | 6.0 | | |
| CC-3-V1 | 5.0 | | |
| Σ | 100.0 | | |

As in Example 1, the liquid-crystal medium is introduced into a VA display with TFT addressing. This display exhibits, in particular, very short response times.

EXAMPLE 8

| Compound/ abbreviation | Concentration/ % by weight | Physical properties | |
|---|---|---|---|
| PQPY-5-O2 | 20.0 | T(N,I) = | 86.5° C. |
| PCH-304FF | 14.0 | $n_e$ (20° C., 589 nm) = | 1.5930 |
| PCH-502FF | 10.0 | Δn (20° C., 589 nm) = | 0.1109 |
| PCH-504FF | 13.0 | $\epsilon_\perp$ (20° C., 1 kHz) = | 9.0 |
| CCP-302FF | 9.0 | Δε (20° C., 1 kHz) = | −5.1 |
| CCP-502FF | 8.0 | $\gamma_1$ (20° C.) = | 239 mPa · s |
| CCP-21FF | 3.0 | $t_{store}$ (−20° C.) | >1000 h |
| CCP-31FF | 6.0 | $t_{store}$ (−30° C.) | ≧900 h |
| BCH-32 | 6.0 | $t_{store}$ (−40° C.) | ≧600 h |
| CCP-V-1 | 7.0 | $V_0$ (20° C.) = | 1.90 V |
| CC-3-V1 | 5.0 | | |
| Σ | 100.0 | | |

As in Example 1, the liquid-crystal medium is introduced into a VA display with TFT addressing. This display is distinguished, in particular, by the fact that it can be employed in a large temperature range and a low addressing voltage is required.

EXAMPLE 9

| Compound/ abbreviation | Concentration/ % by weight | Physical properties | |
|---|---|---|---|
| CQPY-5-O2 | 11.0 | T(N,I) = | 86.5° C. |
| PCH-304FF | 13.0 | $n_e$ (20° C., 589 nm) = | 1.5971 |

EXAMPLE 9-continued

| Compound/abbreviation | Concentration/% by weight | Physical properties | |
|---|---|---|---|
| PCH-502FF | 12.0 | $\Delta n$ (20° C., 589 nm) = | 0.1080 |
| PCH-504FF | 16.0 | $\epsilon_\perp$ (20° C., 1 kHz) = | 9.0 |
| CCP-302FF | 12.0 | $\Delta\epsilon$ (20° C., 1 kHz) = | −5.2 |
| CCP-502FF | 13.0 | $\gamma_1$ (20° C.) = | 262 mPa · s |
| CCP-21FF | 8.0 | $t_{store}$ (−20° C.) | >1000 h |
| BCH-32 | 8.0 | $t_{store}$ (−30° C.) | ≧800 h |
| CCP-V-1 | 4.0 | $t_{store}$ (−40° C.) | ≧500 h |
| PGIGI-3-F | 3.0 | $V_0$ (20° C.) = | 1.90 V |
| Σ | 100.0 | | |

As in Example 1, the liquid-crystal medium is introduced into a VA display with TFT addressing. This display is distinguished, in particular, by the fact that it can be employed in a large temperature range.

EXAMPLE 10

| Compound/abbreviation | Concentration/% by weight | Physical properties | |
|---|---|---|---|
| CQY-5-O2 | 12.0 | T(N,I) = | 70° C. |
| PCH-304FF | 18.0 | $n_e$ (20° C., 589 nm) = | 1.5850 |
| PCH-502FF | 9.0 | $\Delta n$ (20° C., 589 nm) = | 0.1011 |
| CPY-2-O3 | 13.0 | $\epsilon_\perp$ (20° C., 1 kHz) = | 6.9 |
| CPY-3-O3 | 13.0 | $\Delta\epsilon$ (20° C., 1 kHz) = | −3.3 |
| BCH-32 | 6.0 | $\gamma_1$ (20° C.) = | 115 mPa · s |
| CCP-V-1 | 2.0 | $t_{store}$ (−40° C.) | >1000 h |
| CC-5-V | 18.0 | $V_0$ (20° C.) = | 2.10 V |
| CC-3-V1 | 9.0 | | |
| Σ | 100.0 | | |

As in Example 1, the liquid-crystal medium is introduced into a VA display with TFT addressing. This display is distinguished, in particular, by very short response times.

EXAMPLE 11

| Compound/abbreviation | Concentration/% by weight | Physical properties | |
|---|---|---|---|
| CQY-5-O2 | 13.0 | T(N,I) = | 71.0° C. |
| PCH-304FF | 10.0 | $\Delta n$ (20° C., 589 nm) = | 0.0792 |
| PCH-502FF | 13.0 | $\epsilon_\perp$ (20° C., 1 kHz) = | 8.0 |
| PCH-504FF | 14.0 | $\Delta\epsilon$ (20° C., 1 kHz) = | −4.2 |
| CCP-302FF | 11.0 | $\gamma_1$ (20° C.) = | 140 mPa · s |
| CCP-502FF | 14.0 | $V_0$ (20° C.) = | 2.0 V |
| CCH-35 | 8.0 | | |
| CC-3-V1 | 9.0 | | |
| CC-5-V | 5.0 | | |
| CCP-V1 | 3.0 | | |
| Σ | 100.0 | | |

As in Example 1, the liquid-crystal medium is introduced into a VA display with TFT addressing. This display is distinguished, in particular, by very short response times.

The liquid-crystal mixtures of examples 1 and 3 to 11 can also be used with good results in IPS displays.

We claim:

1. A nematic liquid-crystal medium, which comprises a) a dielectrically negative, liquid-crystalline component A which comprises one or more dielectrically negative compounds of one of the formulae I-1, I-3 and I-4:

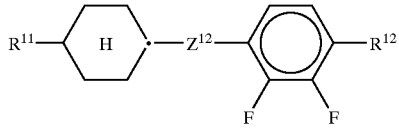

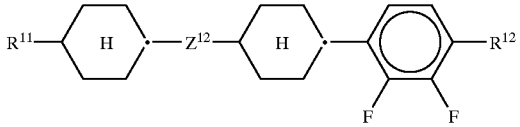

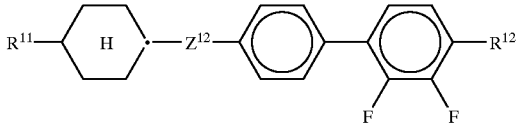

in which $R^{11}$ is alkyl having from 1 to 7 carbon atoms, alkoxy having from 1 to 7 carbon atoms or alkenyloxy having from 2 to 7 carbon atoms, $R^{12}$ is alkyl or alkoxy having from 1 to 7 carbon atoms or alkenyl, alkenyloxy or alkoxyalkyl having from 2 to 7 carbon atoms, and $Z^{12}$ is $OCF_2$ or $CF_2O$, and b) a dielectrically negative, liquid-crystalline component, B, different from component A, and c) optionally, a dielectrically neutral, liquid-crystalline component C, and d) optionally, a dielectrically positive, liquid-crystalline component D.

2. A liquid-crystal medium of claim 1, wherein component B comprises one or more compounds selected from the group consisting of the compounds of the formulae II and III

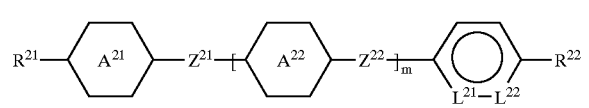

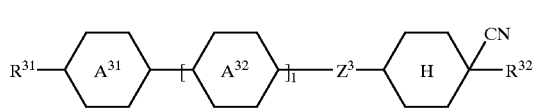

in which $R^{21}$ is alkyl or alkoxy having from 1 to 7 carbon atoms or alkoxyalkyl, alkenyl or alkenyloxy having from 2 to 7 carbon atoms, $R^{22}$ is alkyl or alkoxy having from 1 to 7 carbon atoms or alkoxyalkyl, alkenyl or alkenyloxy having from 2 to 7 carbon atoms, $Z^{21}$ and $Z^{22}$ are each, independently of one another, —CH$_2$—CH$_2$—, —CH=CH—, —C≡C—, —COO— or a single bond,

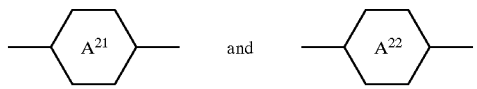

and

are each, independently of one another,

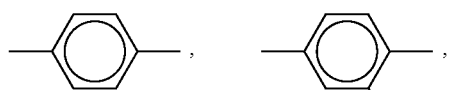

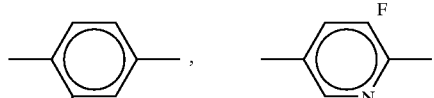

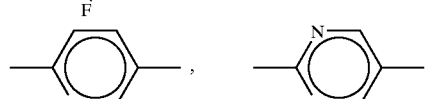

 or $L^{21}$ and $L^{22}$ are both C—F or one of the two is N and the other is C—F, m is 0 or 1, $Z^3$ is —CH$_2$—CH$_2$—, —CH=CH—, —C≡C—, —COO— or a single bond, $R^{31}$ and $R^{32}$ are each, independently of one another, alkyl or alkoxy having from 1 to 7 carbon atoms or alkoxyalkyl, alkenyl or alkenyloxy having from 2 to 7 carbon atoms, and l is 1 or 2.

3. A liquid-crystal medium of claim 2, which comprises one or more compounds of the formula II.

4. A liquid-crystal medium of claim 2 which comprises one or more compounds of the formula III.

5. A liquid-crystal medium of claim 1, which comprises a component C.

6. A liquid-crystal medium of claim 1, which comprises a component D.

7. An electro-optical display comprising a liquid-crystal medium according to claim 1.

8. A display according to claim 7, which is an active matrix display.

9. A display according to claim 7 which is an ECB or IPS display.

10. The liquid-crystal medium of claim 1, wherein $R^{11}$ is alkyl, alkoxy, or alkenyloxy of 2 to 4 carbon atoms and $Z^{12}$ is OCF$_2$.

11. The liquid-crystal medium of claim 5, wherein component C comprises at least one compound of the formula IV:

IV

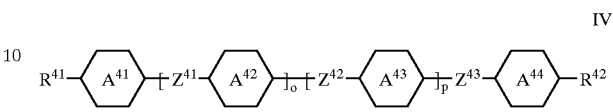

in which $R^{41}$ and $R^{42}$ are each independently of one another, alkyl or alkoxy having from 1 to 7 carbon atoms or alkoxyalkyl, alkenyl or alkenyloxy having from 2 to 7 carbon atoms, $Z^1$, $Z^{42}$, $Z^{43}$ independently of one another, —CH$_2$CH$_2$—, —CH=CH—, —COO— or a single bond,

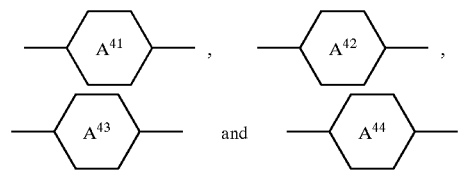

are each, independently of one another,

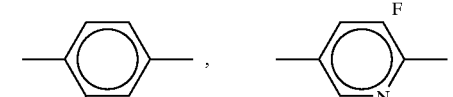

 or

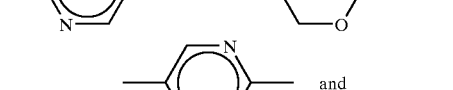

o and p, independently of one another, are 0 or 1.

12. The liquid-crystal medium of claim 1, which comprises 5% to 85% by weight of component A, 5% to 85% by weight of component B, 0 to 50% by weight of component C and 0 to 40% by weight of component D.

13. A display according to claim 8, which further comprises a thin film transistor or varistor.

14. A display according to claim 7, which further comprises a three-pole switching element.

15. A liquid-crystal medium of claim 6, wherein component D comprises at least one compound of the formula V:

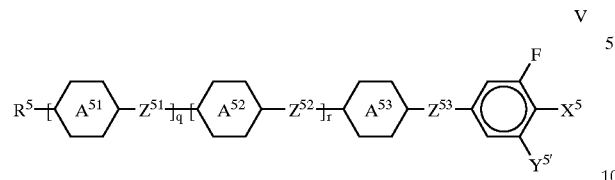

V wherein
$R^5$ is alkyl or alkoxy having from 1 to 7 carbon atoms, or alkoxyalkyl, alkenyl or alkenyloxy having from 2 to 7 carbon atoms,
$Z^{51}$, $Z^{52}$ and $Z^{53}$ are each, independently of one another, $-CH_2-CH_2-$, $-CH=CH-$, $-C\equiv C-$, $-COO-$ or a single bond,

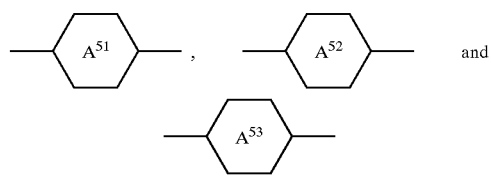

are each, independently of one another,

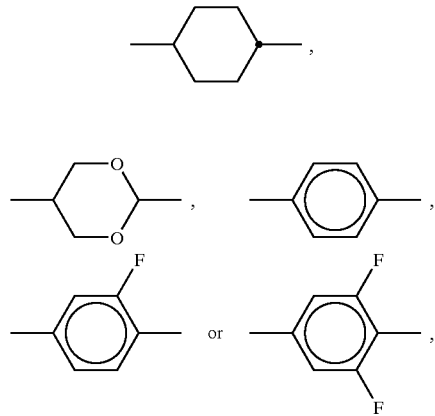

$X^5$ is F, $OCF_2H$ or $OCF_3$, and
$Y^5$ is H or F, and
q and r are each, independently of one another, 0 or 1.
16. A liquid-crystal medium of claim 15, wherein $Y^5$ is F and $X^5$ is F or $OCF_2H$.

17. A liquid-crystal medium of claim 11, wherein at least two of the rings $A^{41}$, $A^{42}$, $A^{43}$ and $A^{44}$ are:

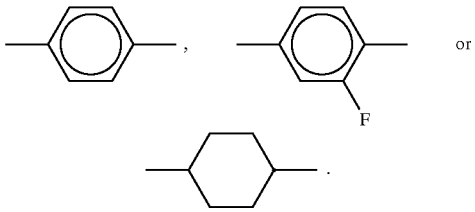

18. A liquid-crystal medium of claim 11, wherein at least two of the rings $A^{41}$, $A^{42}$, $A^{43}$ and $A^{44}$ are linked directly to one another.
19. A liquid-crystal medium of claim 11, wherein at least two of the rings $A^{41}$, $A^{42}$, $A^{43}$ and $A^{44}$ are linked directly to one another as:

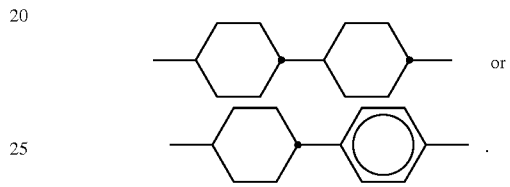

20. A liquid-crystal medium of claim 1, which further comprises one or more dielectrically negative compounds of the formula VI:

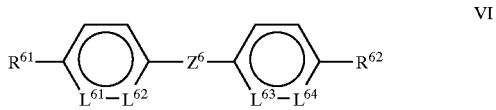

VI in which
$R^{61}$ and $R^{62}$ are each independently alkyl having from 1 to 7 carbon atoms, alkoxy having from 1 to 7 carbon atoms, or alkenyloxy having from 2 to 7 carbon atoms,
$Z^{61}$ is $-CH_2-CH_2-$, $-CH=CH-$, $-C\equiv C-$, $-COO-$ or a single bond,
$L^{61}$ and $L^{62}$ are both C—F or one of the two is N and the other is C—F, and
$L^{63}$ and $L^{64}$ are both C—F or one of the two is N and the other is C—F.
21. A liquid-crystal medium of claim 1, wherein, in formulae I-1, I-3 and I-4, $Z^{12}$ is $OCF_2$.

* * * * *